US009613164B2

(12) United States Patent
Broecheler et al.

(10) Patent No.: US 9,613,164 B2
(45) Date of Patent: Apr. 4, 2017

(54) SYSTEM AND METHOD FOR DATA MANAGEMENT IN LARGE DATA NETWORKS

(75) Inventors: Matthias Broecheler, Catonsville, MD (US); Venkatramanan Siva Subrahmanian, Potomac, MD (US); Andrea Pugliese, Castrovillari (IT)

(73) Assignee: UNIVERSITY OF MARYLAND, COLLEGE PARK, College Park, MD (US)

( * ) Notice: Subject to any disclaimer, the term of this patent is extended or adjusted under 35 U.S.C. 154(b) by 0 days.

(21) Appl. No.: 13/395,331

(22) PCT Filed: Sep. 13, 2010

(86) PCT No.: PCT/US2010/048602
§ 371 (c)(1),
(2), (4) Date: Aug. 27, 2012

(87) PCT Pub. No.: WO2011/032077
PCT Pub. Date: Mar. 17, 2011

(65) Prior Publication Data
US 2012/0317142 A1 Dec. 13, 2012

Related U.S. Application Data

(60) Provisional application No. 61/241,667, filed on Sep. 11, 2009, provisional application No. 61/292,299, filed on Jan. 5, 2010.

(51) Int. Cl.
*G06F 17/30* (2006.01)

(52) U.S. Cl.
CPC .. *G06F 17/30958* (2013.01); *G06F 17/30864* (2013.01)

(58) Field of Classification Search
CPC .................................................. G06F 17/30864
USPC ....... 707/706, 722, 736, 758, 769, 770, 781, 707/999.003–999.006
See application file for complete search history.

(56) References Cited

U.S. PATENT DOCUMENTS

| 2006/0271564 | A1 | 11/2006 | Meng Muntz et al. |
| 2007/0266144 | A1 | 11/2007 | Bollen et al. |
| 2009/0228296 | A1 | 9/2009 | Ismalon |
| 2010/0049770 | A1* | 2/2010 | Ismalon ........................ 707/765 |
| 2012/0124034 | A1* | 5/2012 | Jing et al. ..................... 707/722 |

\* cited by examiner

*Primary Examiner* — Syling Yen
(74) *Attorney, Agent, or Firm* — Sughrue Mion, PLLC

(57) ABSTRACT

A system and method for storing an input data network, in the form of graph is provided. The system includes a master node and a plurality of slave nodes. The master node is operable to receive the data network in the form of a graph, the graph including a plurality of vertices connected by edges; calculate a probability of co-retrieval for each of the plurality of vertices; and assign each of the plurality of vertices to one of the plurality of compute nodes based on the calculated probability of co-retrieval. Another method and system are provided for converting a dataset into a graph based index and storing the index on disk. Respective systems and methods of querying such data networks are also provided.

4 Claims, 23 Drawing Sheets

SYSTEM AND METHOD FOR DATA MANAGEMENT IN LARGE DATA NETWORKS

CROSS-REFERENCE TO RELATED PATENT APPLICATIONS

The present application is a National Stage of International Application No. PCT/US2010/048602 filed on Sep. 13, 2010, which claims benefit from U.S. Provisional Application No. 61/241,667 filed on Sep. 11, 2009 and U.S. Provisional Application No. 61/292,299 filed on Jan. 5, 2010, the contents of all of which applications are incorporated herein by reference in their entirety.

BACKGROUND

1. Field of the Invention

Apparatuses and methods consistent with the present invention relate to databases and large distributed database systems.

2. Description of the Related Art

During the last decade, there has been viral growth in social networks (SN). FaceBook, Flickr, Twitter, YouTube and Blogger, all implement social networks. Both SN owners and SN users are interested in a variety of queries that involve subgraph matching. For example, consider the small social network 100 shown in FIG. 1. Users of such a network might ask queries such as:

Find all vertices $?v_1$, $?v_2$, $?v_3$, $?p$ such that $?v_1$ works at the University of Maryland and $?v_1$ is a faculty member and $?v_2$ is an Italian university and $?v_3$ is a faculty member at $?v_2$ who is a friend of $?v_1$ and $?v_3$ has commented on a posting (or paper) $?p$ by $?v_1$. This query corresponds to a query graph 200 as shown in FIG. 2—it might be used by a University President to find existing interactions between his faculty and those in Italy (e.g., just before he goes for a meeting with the Italian embassy). When this query subgraph 200 is posed against an enormous SN, it is not feasible to match the subgraph in a naive way against the graph—without intelligent processing, the query would simply take too long. In the above subgraph 200 and the SN 100, the nodes are called vertices and the edges between two nodes specify relationships between two vertices.

Query 200 above contains multiple vertices and different relationships between the vertices, demonstrating the need to execute complex queries over social networks. In addition, answering SPARQL queries in the Semantic Web's RDF framework often involves subgraph matching. A goal of the present disclosure is to show how to answer such queries and more complex ones over large social networks efficiently. A further goal of the present disclosure is to show how to store such large SNs on a plurality of computers (a cloud of computers) and how to answer queries from a client when the SN is stored in this cloud of computers.

Another goal of the present disclosure is to create a graph-based index for a database (such as an RDF database) such that the complete index can reside on a single disk. RDF (Resource Description Framework) is an increasingly important paradigm for the representation of information on the Web. As RDF databases increase in size to approach tens of millions of triples, and as sophisticated graph matching queries expressible in languages like SPARQL become increasingly important, scalability becomes an issue. For data sets of this size secondary memory needs to be used for storage. There is therefore a growing need for indexes that can operate efficiently when the index itself resides on disk.

SUMMARY

Exemplary embodiments of the present invention address at least the above problems and/or disadvantages and other disadvantages not described above. Also, the present invention is not required to overcome the disadvantages described above, and an exemplary embodiment of the present invention may not overcome any of the problems listed above.

According to an exemplary embodiment of the present disclosure, a method and system are provided for partitioning a data network in the form of a graph into subgraphs, which are stored on a plurality of compute nodes.

According to another exemplary embodiment, a method and system are provided for querying the partitioned data network stored on the plurality of compute nodes.

According to a further exemplary embodiment, a method and a system are provided for converting a dataset into a graph based index and storing the index on disk. According to another exemplary, a method and system are providing for answering queries using the stored index.

BRIEF DESCRIPTION OF THE DRAWINGS

The above and/or other aspects of the present invention will be made more apparent by describing certain exemplary embodiments of the present invention with reference to the accompanying drawings, in which.

DETAILED DESCRIPTION OF EXEMPLARY EMBODIMENTS

Figure 1:
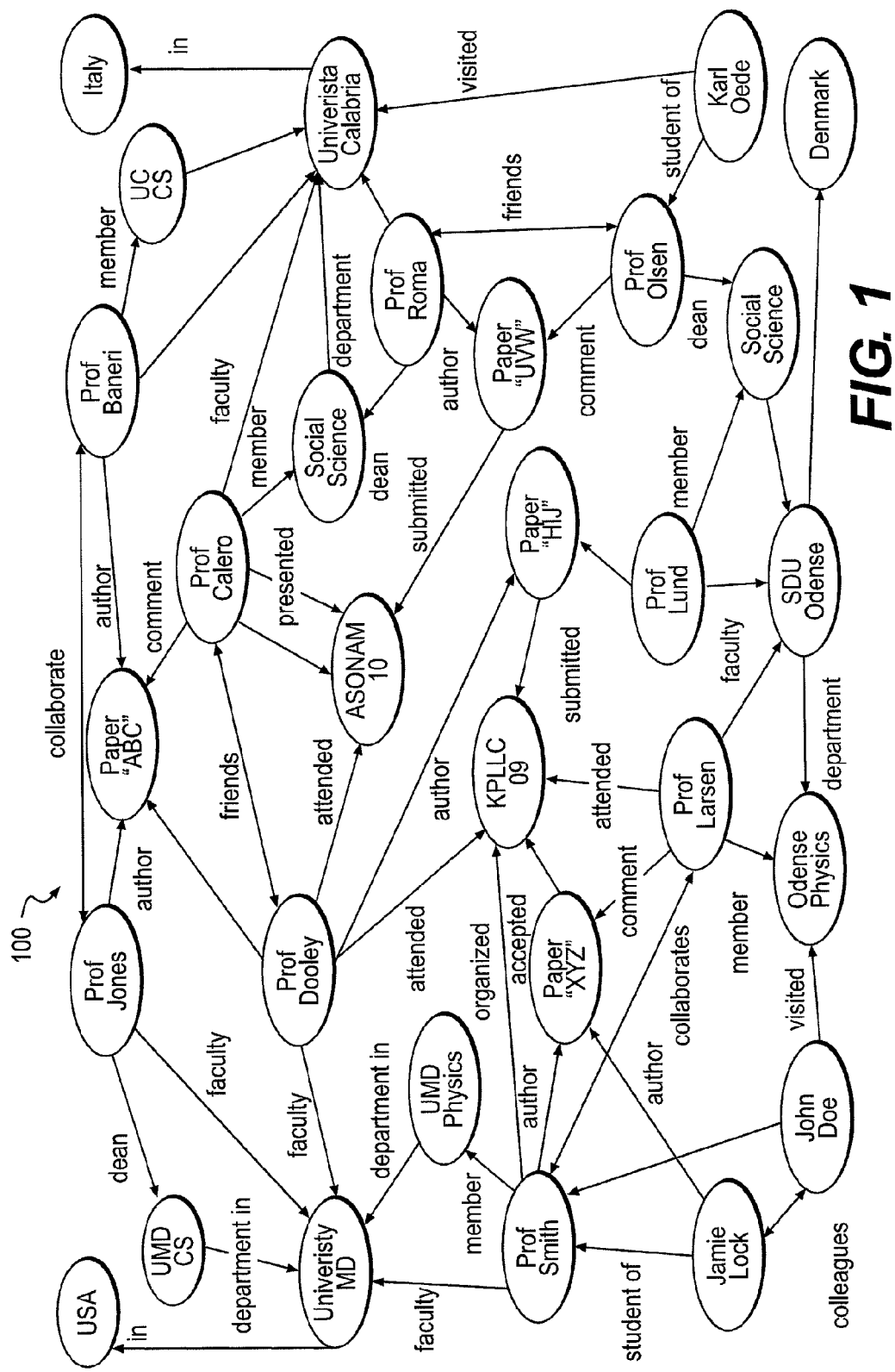
FIG. 1 describes an exemplary social network, which is represented as a graph.

Certain exemplary embodiments of the present invention will now be described in greater detail with reference to the accompanying drawings.

In the following description, like drawing reference numerals are used for like elements, even in different drawings. The matters defined in the description, such as detailed construction and elements, are provided to assist in a comprehensive understanding of the invention. However, the present invention can be practiced without those specifically defined matters. Also, well-known functions or constructions are not described in detail since they would obscure the invention with unnecessary detail.

Figure 3:
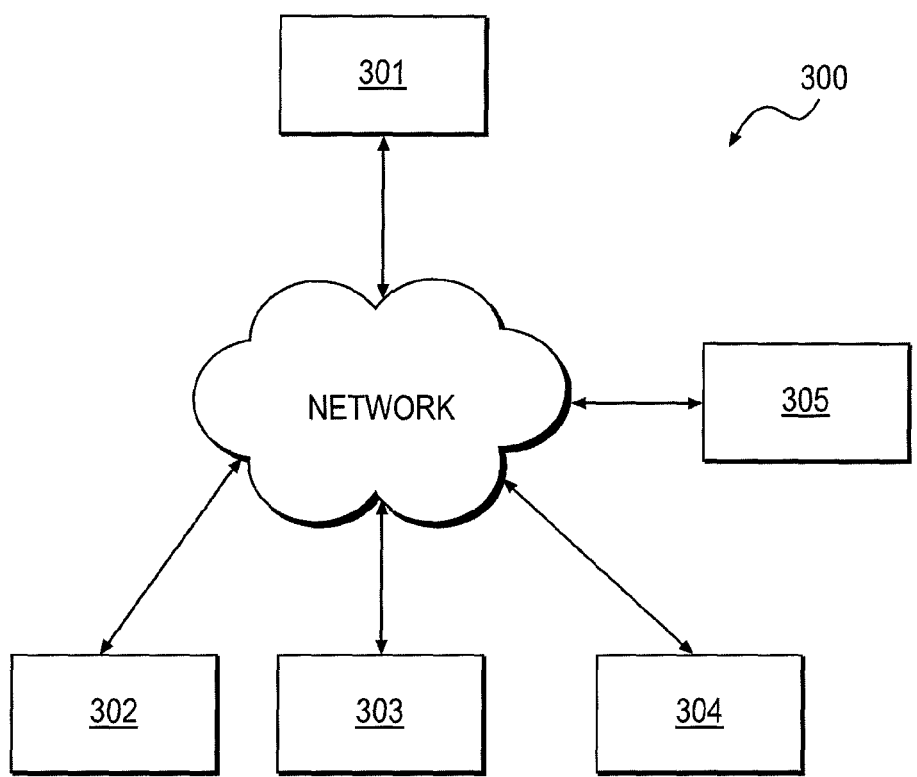
FIG. 3 illustrates an exemplary cloud of compute nodes for storing a dataset over a plurality of compute nodes and answering user queries on the stored dataset.

A first exemplary embodiment describes how a SN (such as the one shown in FIG. 1) may be "split" across a compute cloud so that we can efficiently process subgraph matching queries. An exemplary compute cloud 300 is described in FIG. 3. Compute cloud 300 consists of k "slave" nodes 302, 303, 304, 305 and one "master" node 301. It should be noted that there can be a plurality of master nodes 301. Each of the elements may communicate through a suitable network. Each of the slave nodes may be independent processors with individual memory systems. The slave nodes may communicate directly without going through the master, thus preventing the master from becoming a communication bottleneck. The master node 301 takes an initial query Q and directs it or parts of it to one or more slave nodes that then complete the computation of the answer with no further interaction with the master till the complete answer is assembled. At this stage, the complete answer is shipped to the master, which sends the result to the user. The master is primarily an interface to the user. The master node 301 can be more generally a server that receives queries in some format from user machines spread across a network and then converts these queries into a query language that is understood by the compute nodes.

Figure 4A:
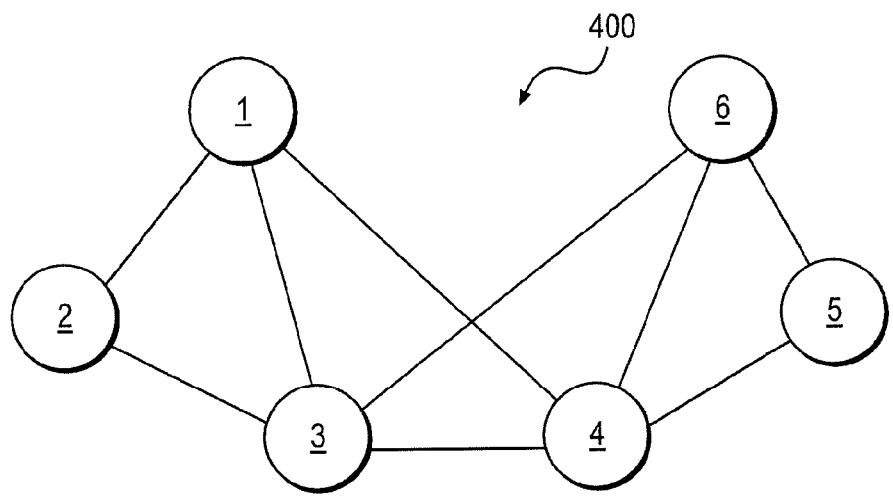
FIGS. 4A and 4B illustrate an exemplary graph and its co-retrieval graph.
Figure 4B:
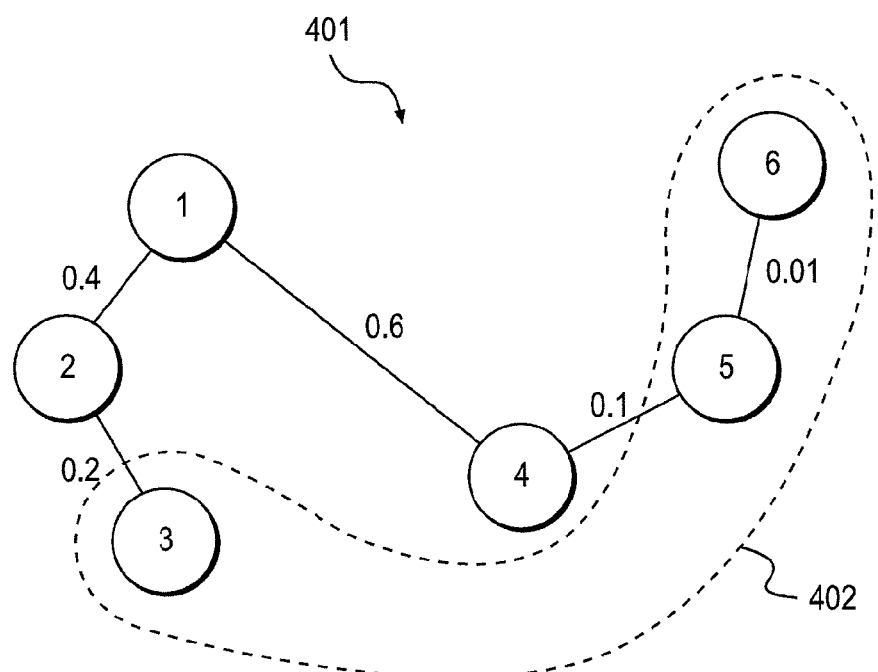
Figure 5:
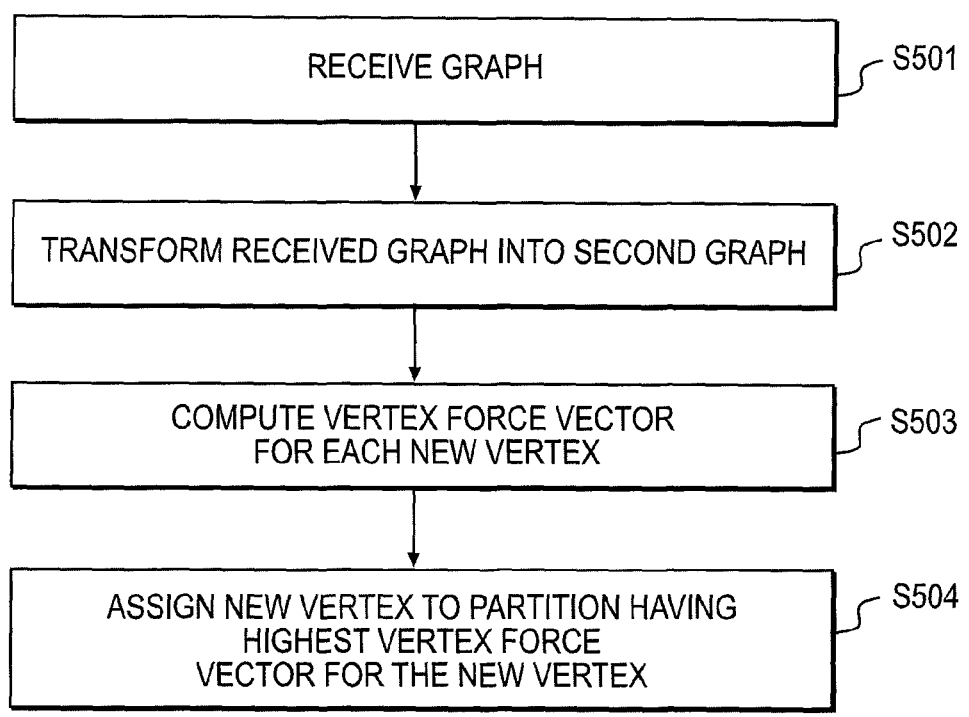
FIG. 5 illustrates an exemplary method for partitioning an input graph across a compute cloud.

Next, an exemplary implementation is described with respect to FIGS. 4A, 4B, and 5 which show how a SN may be "split" across a compute cloud (such as the one shown in FIG. 3) so that we can efficiently process subgraph matching queries. One of the objectives here is to find a way to partition the input graph into blocks that can be stored across multiple slave nodes such that the expected time to answer queries is small. The splitting process begins with the transformation of the SN into a weighted graph. For purposes of illustration, FIG. 4A shows an exemplary SN 400 in the form of a graph which we are interested in distributing across "K" slave nodes. The graph has 6 vertices and the edges connecting the various vertices can represent a relationship between the vertices. The graph shown in FIG. 4A may or may not be a directed graph. That is, the edges between two nodes may or not may not have a direction like the edges in FIG. 1. The graph 400 (also the SN 400) is transformed into a second graph 401, in which the vertices are connected by edges that now represent the probability of co-retrieval over some query space. For example, the probability that vertices 1 and 4 will be co-retrieved is 0.6 in FIG. 4B. It is possible that some vertices may not be connected by an edge in graph 401. This may be the case when the probability of co-retrieval is zero or below a user-defined threshold. The weight of an edge (v1, v2) in the graph 401 refers to the sum of the probability that v2 will be retrieved immediately after v1 and vice versa when an arbitrary query is processed. Exemplary implementations to find the probability of co-retrieval are described later under section A. Probability of Vertex (Co-) Retrievals. Intuitively if this probability is (relatively) high, then the two vertices should be stored on the same slave node. This intuition can be used to partition the SN across k slave nodes so that expected communication costs are minimized.

A plurality of implementations is possible through which the graph 400 can be split across multiple slave nodes now that the transformed graph 401 has been determined. According to a first exemplary implementation, a vertex is randomly selected and assigned to some slave node. Assignment to a slave node is also referred to as assignment to a partition and such terminology will be used interchangeably hereinafter.

Assuming that node 1 in graph 401 is assigned to slave node 302, it would intuitively make sense to assign vertices 2 and 4 to the slave node 302 as there is a high probability of co-retrieval between vertices 1 and 2 and vertices 1 and 4. If vertices 1, 2, and 4 are assigned to slave node 302, the remaining vertices 3, 5, and 6 may be assigned to slave node 303. The vertices 3, 5, and 6 are assigned to slave node 303 in order to balance the number of vertices assigned to different slave nodes. In the above example, the splitting was focused on two slave nodes but with a bigger input graph, the input graph may be split up over more slave nodes.

It is further hypothesized that the splitting of the transformed graph 402 with minimal edge cut also minimizes the total expected cost of communication between slave nodes and hence, maximizes query throughput. An edge cut 402 is shown in FIG. 4B. The size of the edge cut is the sum of the weights of the edges connecting two vertices in different partitions.

In practice, it is not always feasible to partition a graph to get the minimal edge cut. Such computation is both resource and time consuming. Exemplary implementations of the present disclosure provide fast algorithms that provide good edge cuts (but not necessarily optimal edge cuts). Before the different algorithms are introduced, the notion of a vertex force vector is first introduced. The vertex force vector measures how strongly a partition (slave node) pulls on an input vertex. The vertex force vector is described in greater detail in section B. Vertex force vector.

Next, two methods are described for splitting an input graph across multiple slave nodes. A first method is described with reference to FIG. 5. This method is applicable when a partition P1, P2 . . . , Pk already exists. That is, a plurality of vertices has already been assigned to the "k" slave nodes. However, this algorithm would work also where no partitions exist as yet or no vertices in an input graph have been assigned to any partitions. In step 501, a set of edges are received. This set of edges may correspond to a mini sub-graph or graph such as the one shown in FIG. 4A. In step 502, the input graph is transformed into a second graph in which the probability of co-retrieval is calculated amongst the different vertices. It should be noted that some of the vertices may have already been assigned to one of the partitions. For example, Jack and Jill are two vertices that have been assigned to slave nodes 302 and 303, respectively. A new relationship has been created that relates Tom as friend for both Jack and Jill. Therefore, we have a new sub-graph that involves 3 vertices Tom, Jack, and Jill. Given this new sub-graph in S501, we create a second graph in S502 in which the probability of co-retrieval is determined for Tom, Jack and Tom, Jill. Next, in S503, a vertex force vector is computed for each of the vertices in the transformed graph. In our example, Tom is the new vertex that has not been assigned to a partition/slave node. Hence, a k-dimensional vertex force vector is calculated for the vertex Tom. Here, k refers to the number of slave nodes/partitions. The Tom vertex is then assigned to the partition which has the highest vertex force vector. It should be noted that the algorithm would iterate in a similar manner over all input vertices that have not been assigned to a partition. It should also be noted that once a vertex is assigned to a partition, the information about its relationship to other vertices in different partitions is not lost. Instead, this relationship may be maintained in a pointer to those vertices and partitions to which those vertices have been assigned.

The process of FIG. 5 may be implemented on the master node 301. The master node 301 may include a processor and memory system to carry the process of FIG. 5. Furthermore, the master node 301 may have a plurality of logic blocks such as a receiver block for receiving a graph, a transformation block for transforming the received graph into a second graph, a vertex force vector determination block for computing the vertex force vector for each unassigned vertex, and an assignment block for assigning a vertex to some partition. The master node 301 may further have a database to maintain a look up table for keeping track of the vertex assignments. Each of the blocks described above may be implemented in software such as C, Java, etc.

A second algorithm for partitioning a graph is described with reference to FIG. 6. This algorithm leverages graph modularity to identify a strongly connected subgraph that is loosely connected to the remaining graph. However, modularity cannot be used blindly as our balance requirement must also be met. Next, a definition of modularity is provided.

The modularity of a partition P of an undirected graph G=(V, E) with weight function w:E->R is defined as $$\mathrm{mod}(\mathcal{P}) = \sum_{P \in \mathcal{P}} \left( \frac{W(P, P)}{2|E|} - \frac{\deg_W(P)^2}{(2|E|)^2} \right)$$

Where W(X,Y) is the sum of the weights of edges (x,y) with x in X, y in Y, $\deg_w(v)$ is the sum of the weights of edges (v,-) and $\deg_w(P_i)$ is the sum of the $\deg_w(v)$'s for v in $P_i$ Intuitively, blocks with high modularity are densely connected subgraphs which are isolated from the rest of the graph. The algorithm iteratively builds high modularity blocks and then assigns all vertices in a block to one slave node based on the vertex force vector. Let B be a set of vertices. We generalize the notion of a vertex force vector to sets of vertices by defining $$|\vec{B}|[i] = f_{\mathcal{P}} \left( \sum_{v \in B} \sum_{x \in ngh(v) \cap P_i} w((v, x)) \right)$$

The intuition behind our partitioning algorithm is that assigning vertices at the aggregate level of isolated and densely connected blocks yields good partitions because (i) we respect the topology of the graph, (ii) most edges are within blocks and therefore cannot be cut, and (iii) force vectors of sets of vertices combine the connectedness information of many vertices leading to better assignment decisions.

Given the above background, the second algorithm is now explained in detail with reference to FIG. 6. This second algorithm is applicable when a batch of edges is provided for storing in the compute cloud. There are two phases in the algorithm. In the first phase of the algorithm, we iteratively cluster a co-retrieval subgraph induced by the batch of edges using modularity maximization while preserving any pre-existing vertex-partition assignments. This phase creates a transformed graph from the batch of edges. In the final phase of the algorithm, we assign vertices of the transformed graph to storage partitions (slave nodes) using the concept of a vertex force vector. The algorithm is now explained in detail with reference to FIGS. 6 and 7.

Figure 7:
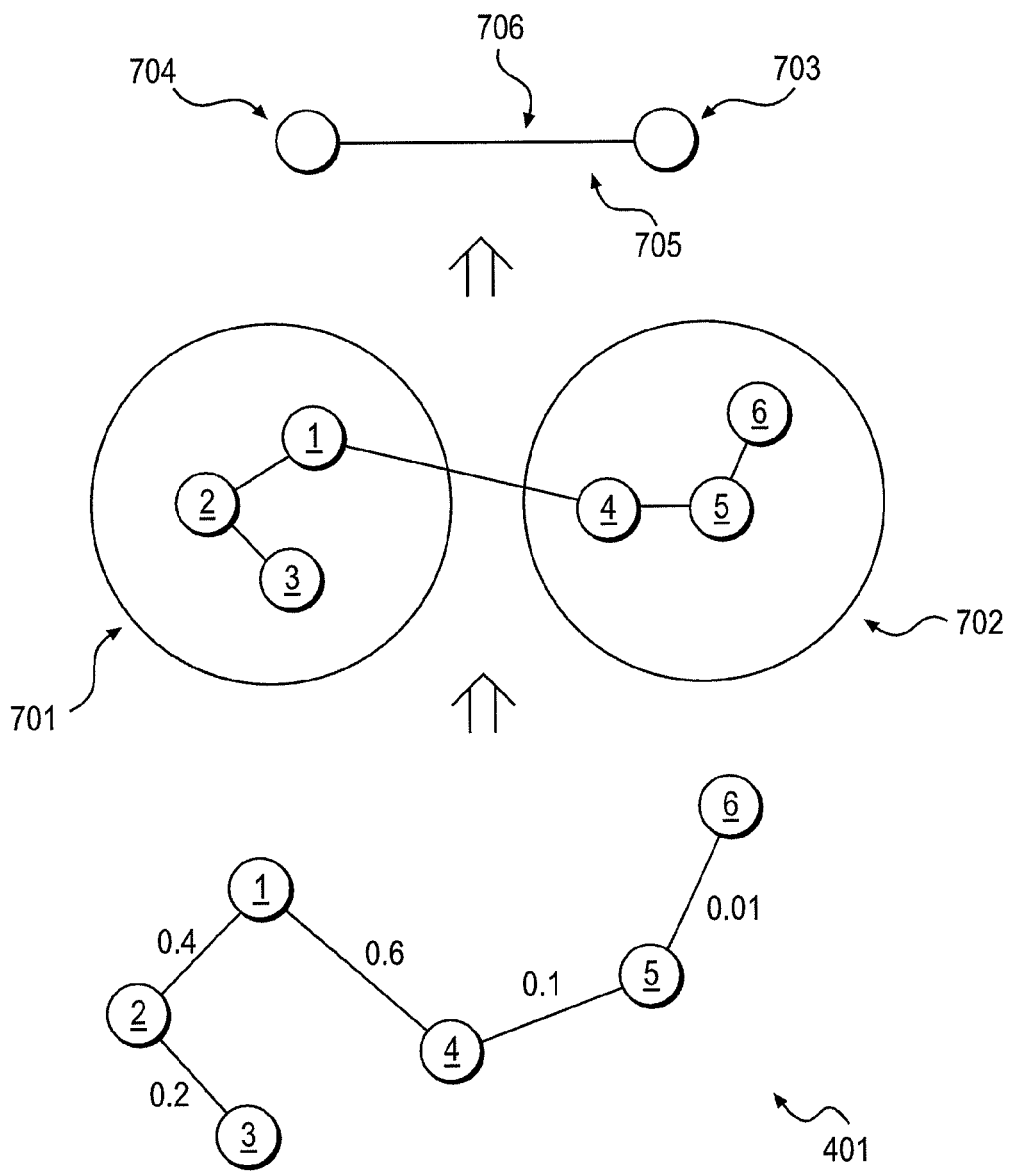
FIG. 7 illustrates an exemplary implementation for clustering vertices in a graph.

In S601, a batch of edges is received by the compute cloud. FIG. 1 is an example of the batch of edges. Similarly, FIG. 4A is also an example of the batch of edges. Now, in S602 a weighted graph (co-retrieval subgraph) is obtained for the batch of edges. In S603, clusters of vertices are created from the weighted graph. Given a weighted graph, each vertex of the graph comprises its own singleton cluster. We iterate over all vertices in the co-retrieval subgraph which have not yet been assigned to a partition and compute whether moving this vertex into the cluster of any of its neighboring vertices would improve the modularity measure (see mod(P) above), which is a commonly used measure to assess the quality of clusters. If so, we move this vertex into the cluster, which yields the highest improvement in modularity. Take for example the co-retrieval subgraph 401 of FIG. 4B. The algorithm could move vertices 1, 2, and 3 into a first cluster 701 and vertices 4, 5, and 6 into a second cluster 702. FIG. 7 shows a result of S603. It should be noted that this exemplary clustering is only shown to conveniently describe the clustering process. Given the actual weights of the edges in FIG. 4B, the resultant clustering may be different.

If the number of moved vertices in S603 exceeds some user defined threshold, the algorithm may go back to S603 and iterate over all vertices again. Otherwise we exit the loop and accept the clustering of vertices as final.

Next, in S604 we transform the input graph into a new graph 705 by merging all vertices assigned to the same cluster into one vertex of the new graph. For example, vertices in the cluster 701 are merged and result in a vertex 704. Similarly, vertices in cluster 702 result in vertex 703. Vertices of the new graph 705 are connected by edges of the weight that equals the sum of the weights of all edges that connect any of the vertices comprising the respective clusters in the input graph. In the instant example, edge 706 is equal to 0.6 because only one edge connects the 2 clusters. However, if there were more than one edge connecting the 2 clusters, their weights would be added up to give the weight of edge 706. If any of the vertices in a cluster has a prior assignment to a storage partition, the vertex in the new graph (transformed graph) 705 corresponding to this cluster preserves that assignment.

If the size of the new graph exceeds a user defined threshold and the relative size of the new graph compared to the size of the input graph is also bigger than some other threshold, then we recursively call the algorithm on the new transformed graph. That is, we recursively follow steps 603 and 604.

Otherwise, we enter the final phase of the algorithm. In the final phase of the algorithm, we assign vertices of the transformed graph 705 to storage partitions using the concept of a vertex force vector (explained earlier). In S605, we randomly iterate over all vertices in the transformed graph 705, which have not yet been assigned to a storage partition.

For each of those vertices we compute the vertex force vector |B|[i] (defined above) with respect to the current assignment of vertices to storage partitions and assign the vertex to the partition with the highest affinity. We repeat this process a specified number of times and then choose the assignment which yields the best balanced edge-cut.

Finally, in S606 we recursively assign all vertices from the input graph contained in the cluster that got merged into a new vertex in the transformed graph to the latter's assigned partition until we have found storage partition assignments for the vertices in the original graph at which point the algorithm terminates. In the example described in FIG. 7, if vertex 704 is assigned to slave node 302, vertices 1, 2, and 3 which belong to cluster 701 that got merged into vertex 704, are assigned to slave node 302.

Figure 6:
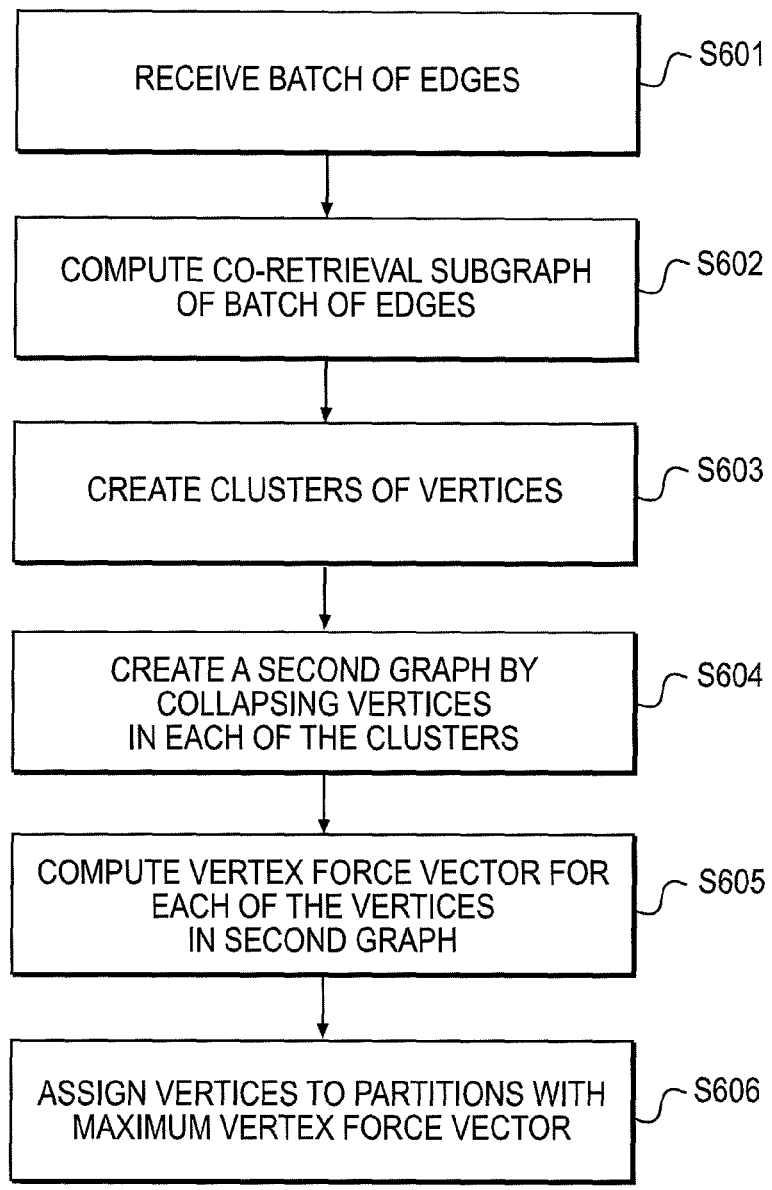
FIG. 6 illustrates another exemplary method for partitioning an input graph across a compute cloud.

It should be noted that the master node 301 may carry out the process of FIG. 6.

Given the above assignment in which vertices are assigned to different slave nodes, an algorithm for answering user queries is described next. The query algorithm referred to in this disclosure as operates asynchronously and in parallel across all slave nodes. A user issues query Q to the master node 301 which "prepares" the query. A first part of the algorithm is executed on the client machine (master node 301) where the user submits a query and the second part algorithm is executed on the slave nodes that are included in the compute cloud (referred to as the COSI cloud). These slave nodes can in general be servers. Together, they answer any given user query.

Figure 8:
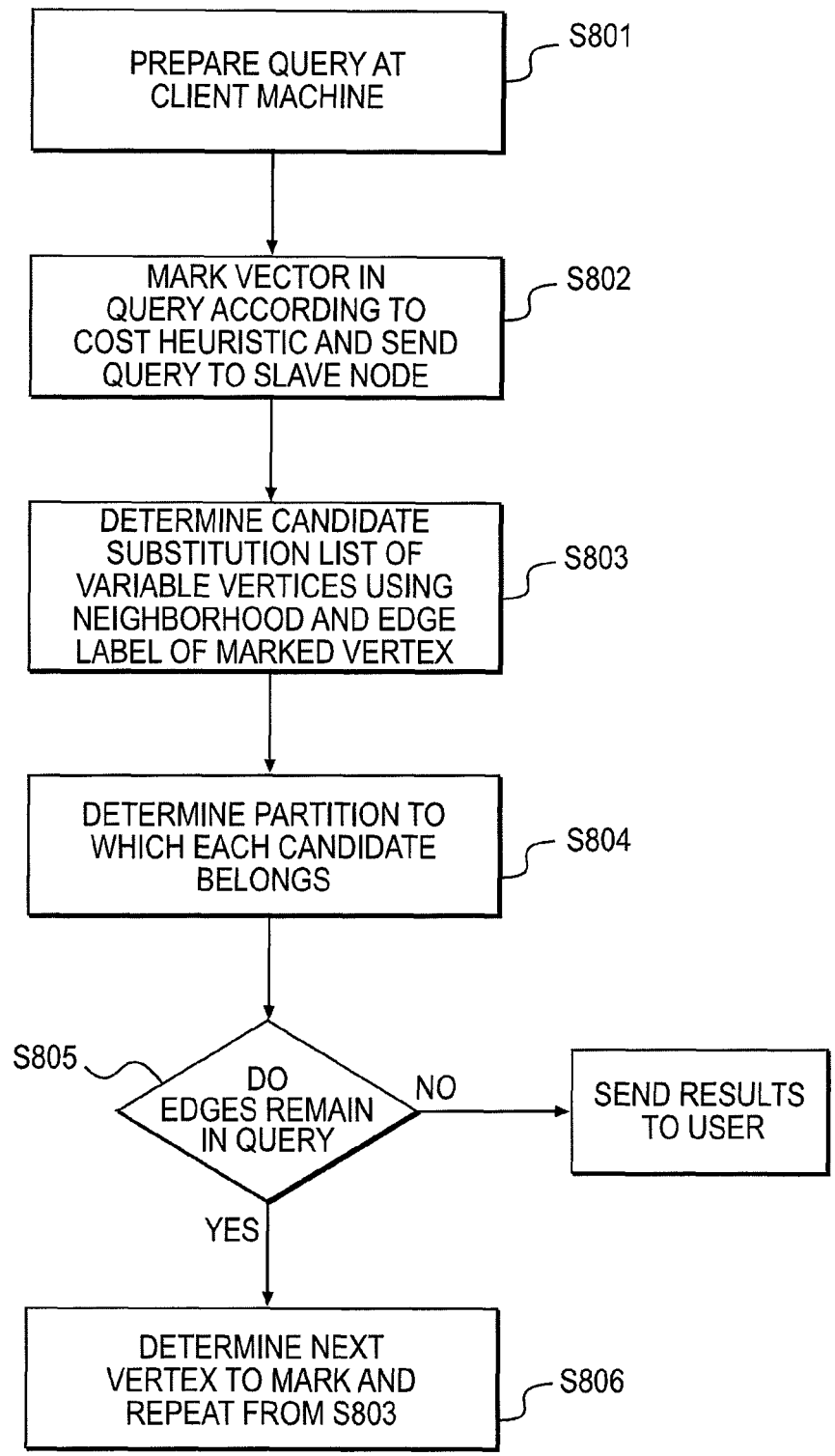
FIG. 8 illustrates an exemplary method for answering user queries for a dataset stored across a compute cloud.

On the client machine, the query is prepared, submitted to the COSI cloud, and the results collected. FIG. 8 describes the algorithm in detail.

Figure 2:
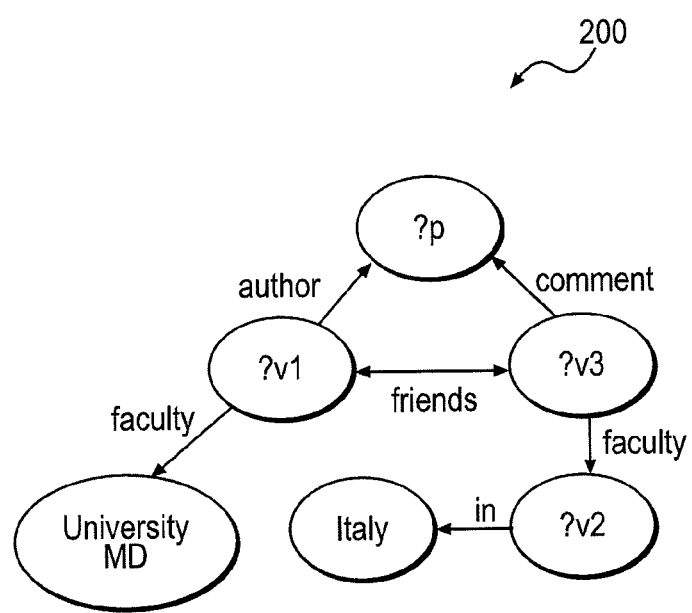
FIG. 2 illustrates an exemplary query to be answered on the exemplary social network of FIG. 1.

In S801, a query is prepared at the client machine and the possible substitution candidate lists get initialized to null, for each variable vertex and to the singleton constant for all constant vertices. The query is assigned a unique id. Consider for purposes of illustration the query 201 shown in FIG. 2. The variable vertices ?v1, ?v2, and ?v3 are initialized to null.

In S802, choose the vertex from the query, which has the lowest expected cost according to a cost heuristic, mark that vertex in the query, determine the vertex's unique id via some dictionary lookup data structure and send the query to the storage node hosting that id. As an example, assume that the vertex University MD is stored on partition P1 and Italy is stored on partition P3. If University MD has a lower expected cost according to a cost heuristic (described later under section C. Cost Heuristic), the query is sent to partition P1 for further processing. In order for this to be possible, a look up table exists on the client machine (master node 301) which stores the address (partition) for each vertex. Furthermore, the look up table can also be stored in the COSI cloud, i.e., stored across the compute nodes.

At this time the algorithm pauses at the client machine and waits for incoming results, which get accumulated into the result list and returned to the user.

The algorithm now moves onto the COSI cloud or the slave nodes. On the COSI servers, the algorithm waits for incoming queries and processes those as follows. In S803, the query proceeds to the partition determined in S802. For the marked vertex (University MD in our example) in the query, we use it's specified unique id to retrieve the vertex's neighboring vertices from disk and intersect those with the candidate substitution lists of the neighboring vertices in the query taking edge labels into account. In our example, the neighborhood of University MD includes 6 vertices (see FIG. 1). However, only 3 vertices (James, Smith, and Dooley) satisfy the edge label "faculty". As the candidate list for ?v1 is null to begin with, we initialize it with the retrieved neighborhood, i.e., James, Smith, and Dooley.

After updating the lists, we remove all edges incident on the marked vertex (University MD). If any of the candidate substitution lists have become empty after updating, we have reached a non-completable query and terminate processing. That is, if we did not find a single vertex that satisfied the edge label faculty for University MD, the query is determined non-completable and processing is terminated.

Figure 9A:
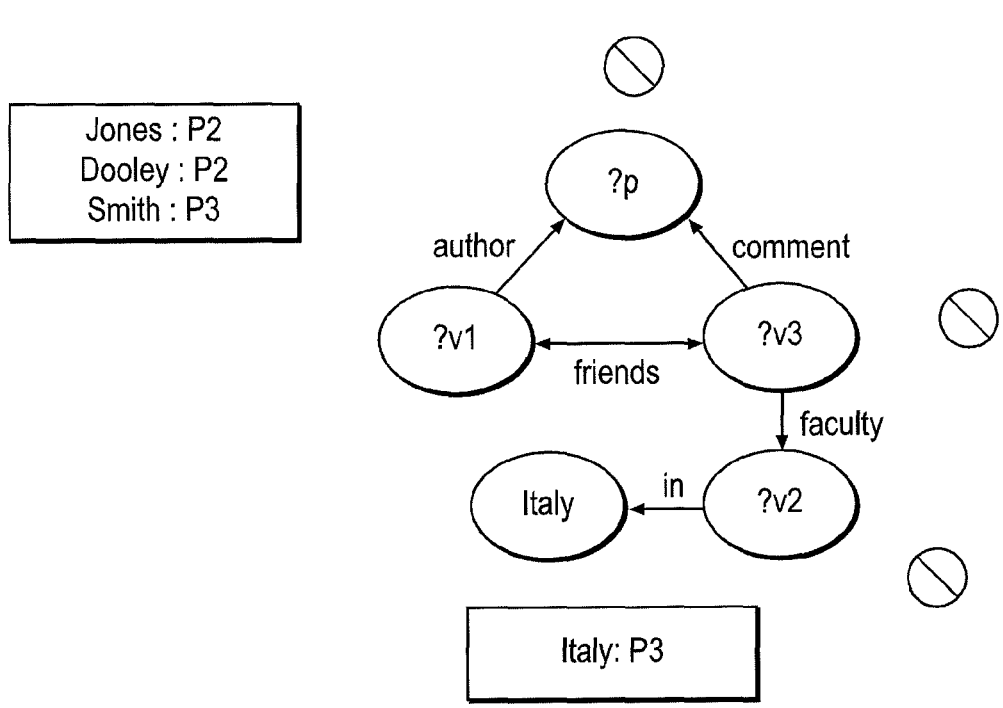
FIGS. 9A and 9B illustrate intermediate results in the method of FIG. 8.

In S804, we determine the partitions to which each of the candidates determined in S803 belong to. A result of this step is shown in FIG. 9A.

In S805, we check whether the query still contains any edges. If not, we have found query results and return the contents of the substitution lists to the client machine that issued the query.

Figure 9B:
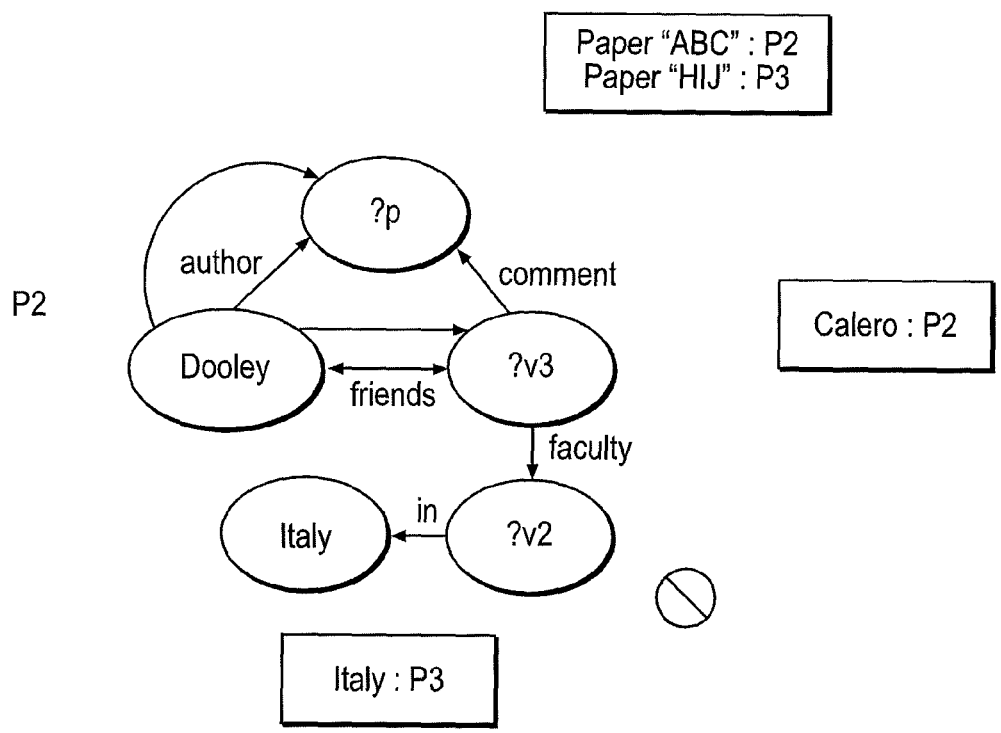

If it is determined in S805 that edges remain, the algorithm proceeds to S806 in which we use the cost heuristic (described later) to determine the next vertex in the query to mark. For the marked vertex, we substitute the unique ids of its current candidate substitution list and forward the resulting partial query to the respective storage nodes. In detail, previously University MD was marked and the search revolved around the neighborhood of University MD. In FIG. 9A, two vertices exist which can be marked. Italy could be marked or ?v1 can be marked. Assume, that our cost heuristic determines that proceeding with ?v1 as the marked vertex has a smaller cost, then ?v1 is marked and one of its candidates is substituted and search proceeds from there. FIG. 9B shows an example in which ?v1 is selected as the marked vertex and Dooley is selected as the candidate to be substituted. If Dooley was substituted and one of its immediate variables (?p and ?v3) gave an empty list, then the next candidate (Smith or Jones) would have been tried.

A. Probability of Vertex (Co-)Retrievals

Assume that there is a probability distribution P over the space of all queries. Intuitively, P(q) is the probability that a random query posed to a SN is q. For any real world SN like Facebook or Orkut, P can be easily learned from frequency analysis of past query logs. A query plan qp(Q) for a query Q is a sequence of two types of operations: the first type retrieves the neighborhood of vertex v (from whichever slave node it is on), and the second type performs some computation (e.g. check a selection condition or perform a join) on the results of previous operations. This definition is compatible with most existing definitions of query plans in the database literature.

Definition 3.1 (Query trace): Suppose x=qp(Q) is a query plan for a query Q on an SN S. The query trace of executing x on S, denoted qt(x, S), consists of (i) all the vertices v in S whose neighborhood is retrieved during execution of query plan x on S, and (ii) all pairs (u, v) of vertices where immediately after retrieving u's neighborhood, the query plan retrieves v's neighborhood (in the next operation of x). Traces contain consecutive retrievals of vertex neighborhoods. This allows us to store neighborhoods of both u and v on the same slave node, avoiding unnecessary communication.

When processing a query, we make the reasonable assumption that index retrievals are cached so that repeated vertex neighborhood retrievals are read from memory and hence the query trace qt(x, S) can be defined as a set rather than as a multiset. The probability distribution P on queries can be used to infer a probability distribution $\tilde{\mathbb{P}}$ over the space of feasible query plans.

$\tilde{\mathbb{P}}(x) = \Sigma_{Q \in Q: qp(Q) = x} \mathbb{P}(Q)$

This says that the probability of a query plan is the sum of the probabilities of all queries which use that query plan. We can now define the probabilities of retrieval and co-retrieval as follows.

Probability of retrieving vertex v: The probability, P(v), of retrieving v when executing a random query plan is $\Sigma_{x \in qp(Q): v \in qt(x,S)} \mathbb{P}(x)$ Thus, the probability of retrieving v is the sum of the probabilities of all query plans that retrieve v.

Probability of retrieving v2 immediately after v1: The probability P(v1, v2) of retrieving v2 immediately after v1 is $\Sigma_{x \in qp(Q):(v_1,v_2) \in qt(x,S)} \mathbb{P}(x)$ This says that the probability of retrieving v2 immediately after v1 is sum of the probabilities of all query plans that retrieve v2 immediately after v1.

Throughout this section, we assume there is a probability distribution P over the space of all queries. Intuitively, P(q) is the probability that a random query posed to a SN is q. For any real world SN like FaceBook or Orkut, P can be easily learned from frequency analysis of past query logs.

B. Vertex Force Vector

Definition (Vertex force vector) Let P={P1, ..., Pk} be a partition of a SN(referred to as S) and consider any block Pi. The vertex force vector, denoted by $|\vec{v}|$, of any vertex v∈S is a k-dimensional vector where $|\vec{v}|[i] = f_p(\Sigma_{x \in ngh(v) \cap P_i} w((v,x)))$ and $f_p: \mathbb{R}^+ \to \mathbb{R}$ function called the affinity measure.

A vertex force vector intuitively specifies the "affinity" between a vertex and each partition block as measured by the affinity measure $f_p$. An affinity measure takes the connectedness between a vertex v and the respective partition block as an argument. The vertex force vector captures the strength with which each partition block "pulls" on the vertex and is used as the basis for a vertex assignment decision. $|v|[i]$ sums up the weights of edges (w(v,x)) from v to each neighboring vertex x in $P_i$. If an inserted edge introduces a new vertex v, we first compute the vertex force vector $|\vec{v}|$ and then assign v to the partition block $P_j$ where $j = \mathrm{argmax}_{1 \le i \le k} |\vec{v}|[i]$.

The vertex force factor could be further modified and defined as a linear combination of three factors.

Connectedness: Obviously, evaluating the connectedness of a vertex v to a partition block is crucial for edge cut minimization—we measure this as the number of edges that connect v to the vertices in a partition Pi.

Imbalance: Balanced partitions lead to even workload distribution, thus enhancing parallelism. Let $|P_i|E = \Sigma_{x \in P_i} \deg(x)$ be the number of edges in Pi; let T be an estimate (even a bad one) of the total number of edges that a given graph is expected to be. Then a reasonable measure of imbalance is the standard deviation of $$\frac{\{|P_i|_E\}_{1 \le i \le k}}{T}.$$

Excessive size. In addition to imbalance, we regulate the size of partition blocks by comparing the actual size of a block to its expected one. If a block grows beyond its expected size, we want to punish such growth more aggressively than imbalance does alone by reducing the affinity further according to the metric $$\left(-\frac{|P_i|_E - \frac{T}{k}}{T}, 0\right).$$

C. Cost Heuristic

The choice of the next variable to be instantiated has profound implications on the running time of COSI basic, as some substitutions yield larger branching factors in the search than others. A cost heuristic can help choose the variable vertex v' which has the lowest cost according to function "hopt".

First, to reduce branching factor, we could choose the variable vertex v' with the smallest number of result candidates. This heuristic only considers the branching factor of the immediate next iteration, but is nevertheless an important metric to consider in the cost heuristic.

Second, whenever we instantiate a vertex on a remote partition block, we have to send a message to the appropriate slave which is expensive. Therefore, we consider the fraction of result candidates which are not stored locally as a cost metric.

When we have to send a query to remote slaves for further processing, we would like to distribute the workload evenly across all slaves. Hence, we also analyze the distribution of result candidates by slave via the cost metric $$ds(v) = \sqrt{\sum_{1 \le i \le k} \left(|R_v^i| - \frac{|R_v|}{k}\right)^2}$$

where $R_v^i$ is the set of result candidates for vertex c restricted to those which reside on slave node i. Finally, we define $$h_{opt}(v) = |R_v| \times \left(1 - \frac{|R_v^l|}{\alpha \times |R_v|}\right) \times \left(1 + \beta \times \frac{ds(v)}{|R_v|}\right)$$

where l is the ID of the local slave node and $\alpha$ and $\beta$ are constants that determine how much the model favors locality over parallelism.

Next, we describe an exemplary implementation where we show how to convert a given dataset into a graph-based index. More specifically, the exemplary implementation is described as an algorithm, which takes an existing graph database and creates a graph-based index for it. We call this index the DOGMA Index.

Figure 10:
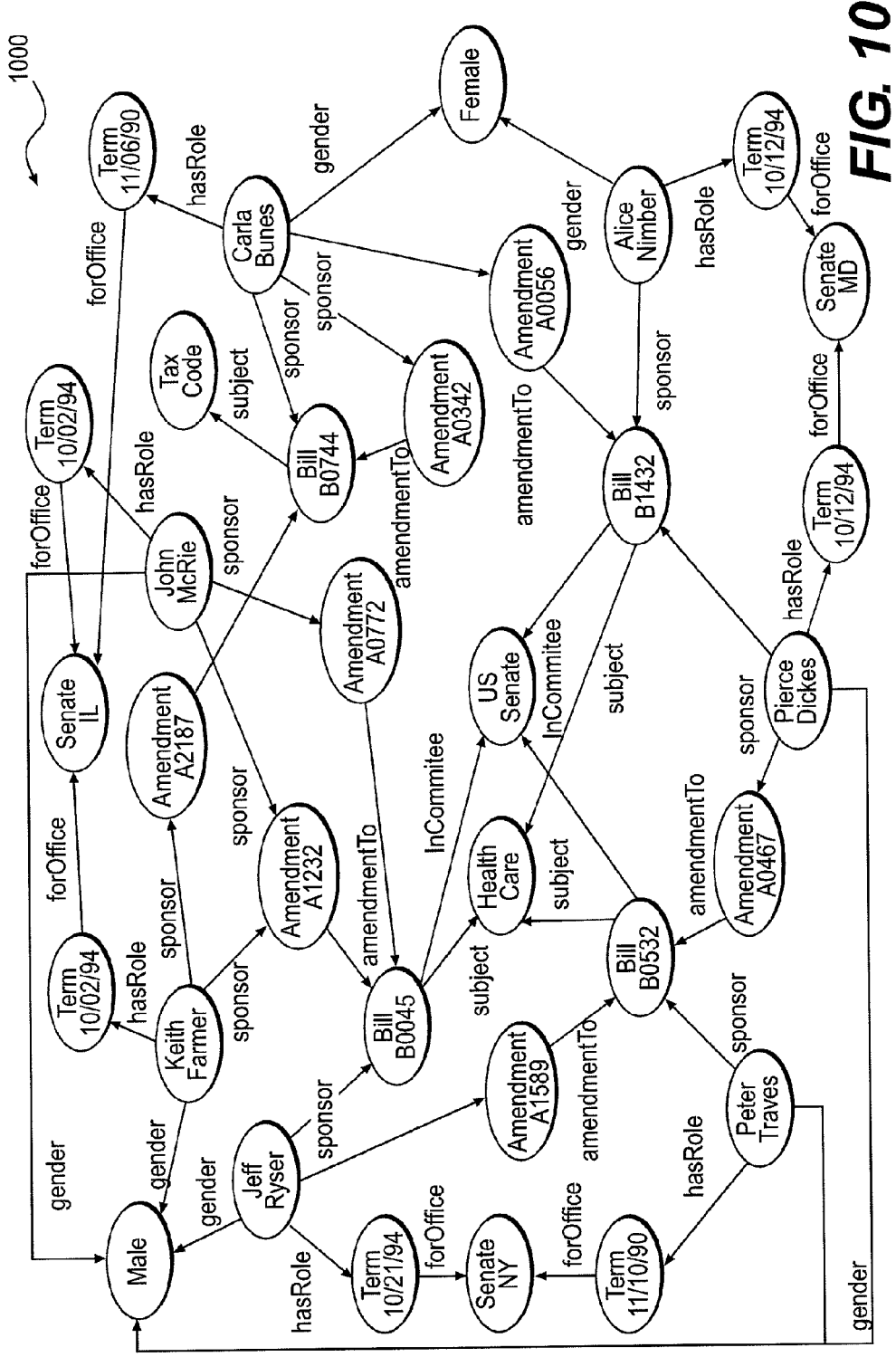
FIG. 10 illustrates an exemplary dataset for converting into a graph-based index.
Figure 11:
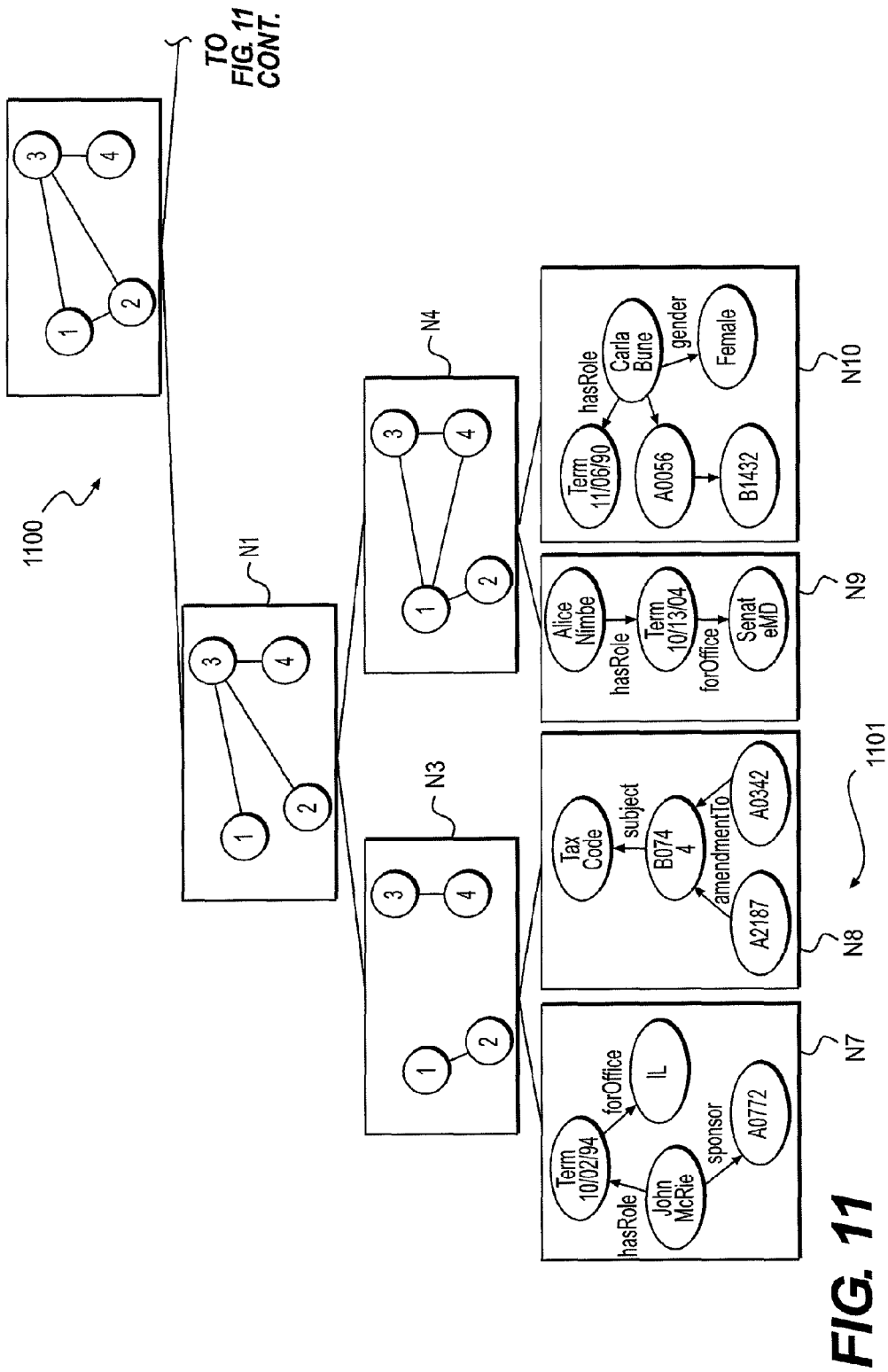
FIG. 11 illustrates an exemplary graph-based index created from the dataset of FIG. 10 by an exemplary implementation of the present disclosure.
Figure 11:
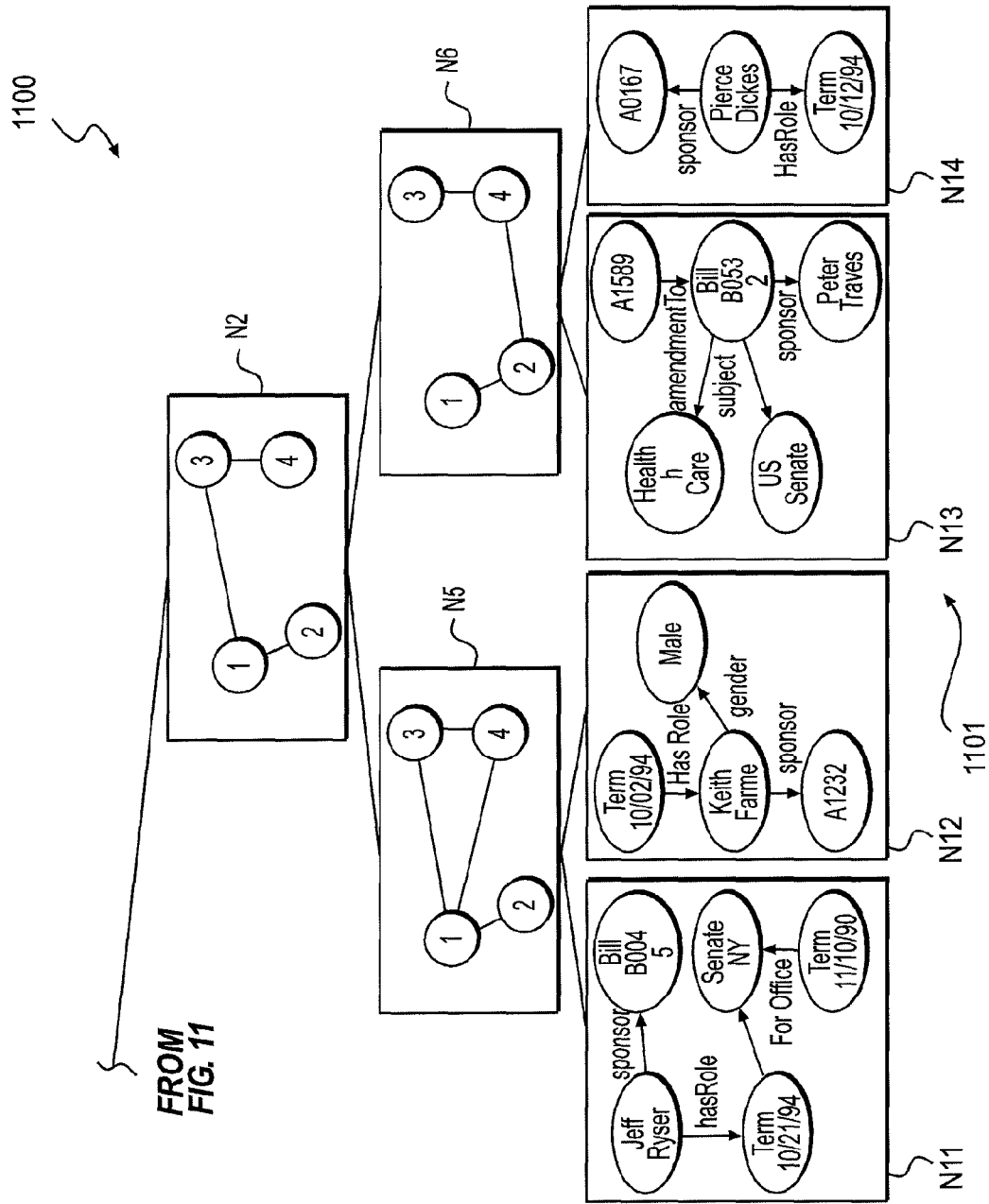

An example dataset 1000 for converting into a graph-based index is shown in FIG. 10. The end result of the algorithm described next is shown in FIG. 11, which describes the resultant DOGMA index 1100. Each of the rectangular boxes of the DOGMA index 1100 corresponds to one node in the index. The vertices in the bottom most layer nodes 1101 (nodes N7-N14) correspond to the vertices of the dataset 1000. Each of these bottom layer nodes 1101 (also called leaf nodes) is stored on a single disk page. Further, any relationship between a vertex in one of the leaf nodes and a vertex in another leaf node is stored as a pointer. For example, the vertex Jeff Ryser is stored in node N11 and the vertex male is stored in node N12. However, in the original dataset Jeff Ryser has a relationship with the vertex male. As these two vertices (Jeff Ryser and Male) are stored on different leaf nodes (disk pages), each of the leaf nodes will store a pointer to the other leaf node to maintain information about the relationship between any related vertices.

Next, the algorithm is described in detail with reference to FIGS. 12A, 12B, and 13. In the interest of simplifying the explanation we choose an exemplary dataset 1201 (in the form of a graph) rather than choosing the complex dataset 1000.

The algorithm begins at S1301 with an input data graph, which is set to G0. It assigns an arbitrary weight of 1 to each vertex and each edge in G0 or uses available statistics to assign suitable weights. In S1302, iteratively coarsen G0 into a graph G1 that has about half the vertices in G0, then coarsen G1 into a graph G2 that has about half the vertices as G1, and so forth until it reaches a graph G whose size is below a user defined threshold. In S1303, the final coarsened graph is set to be the root of a tree (DOGMA tree), and we start building the tree from there in a top-down fashion.

Figure 12A:
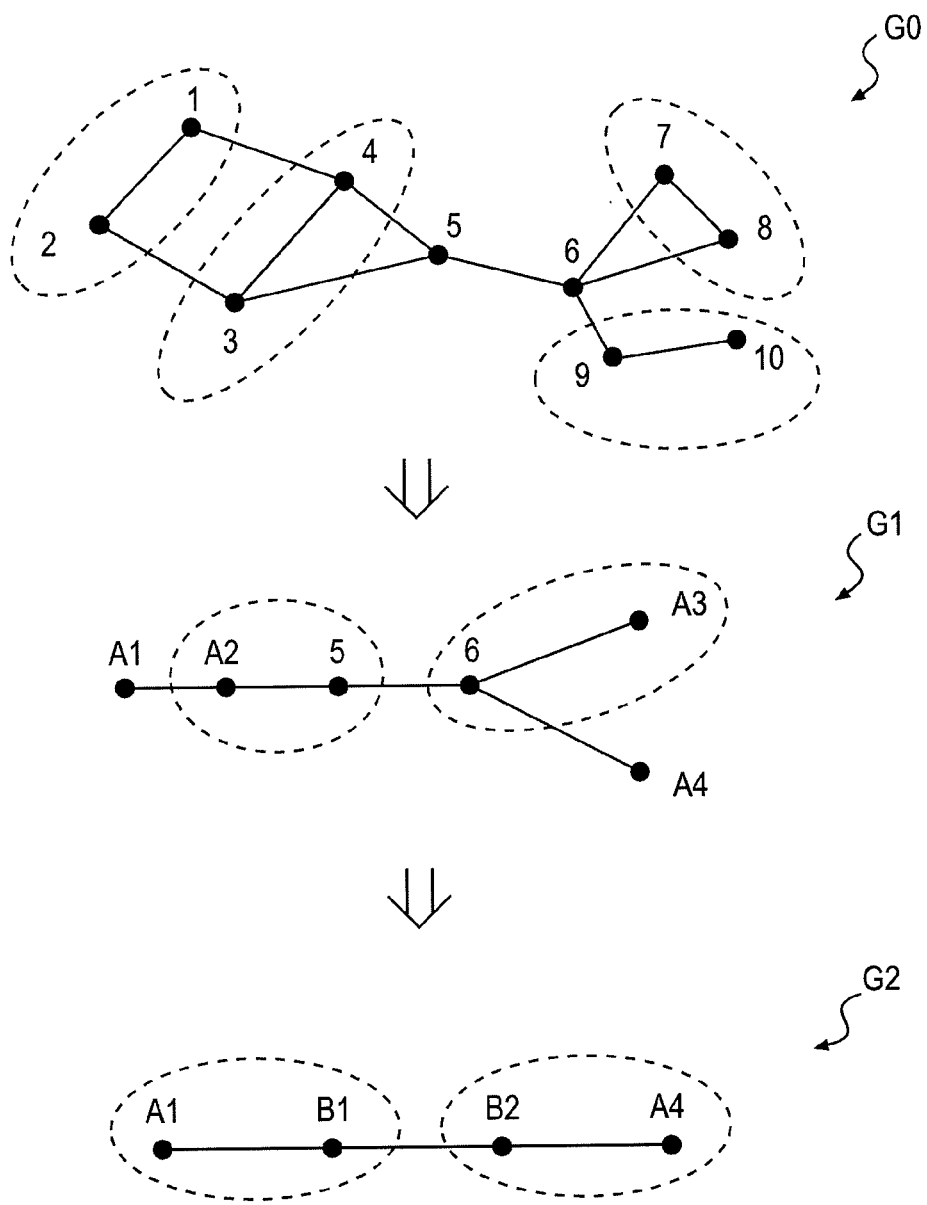
FIGS. 12A and 12B graphically illustrate a method of creating a graph-based index from a given dataset.
Figure 12B:
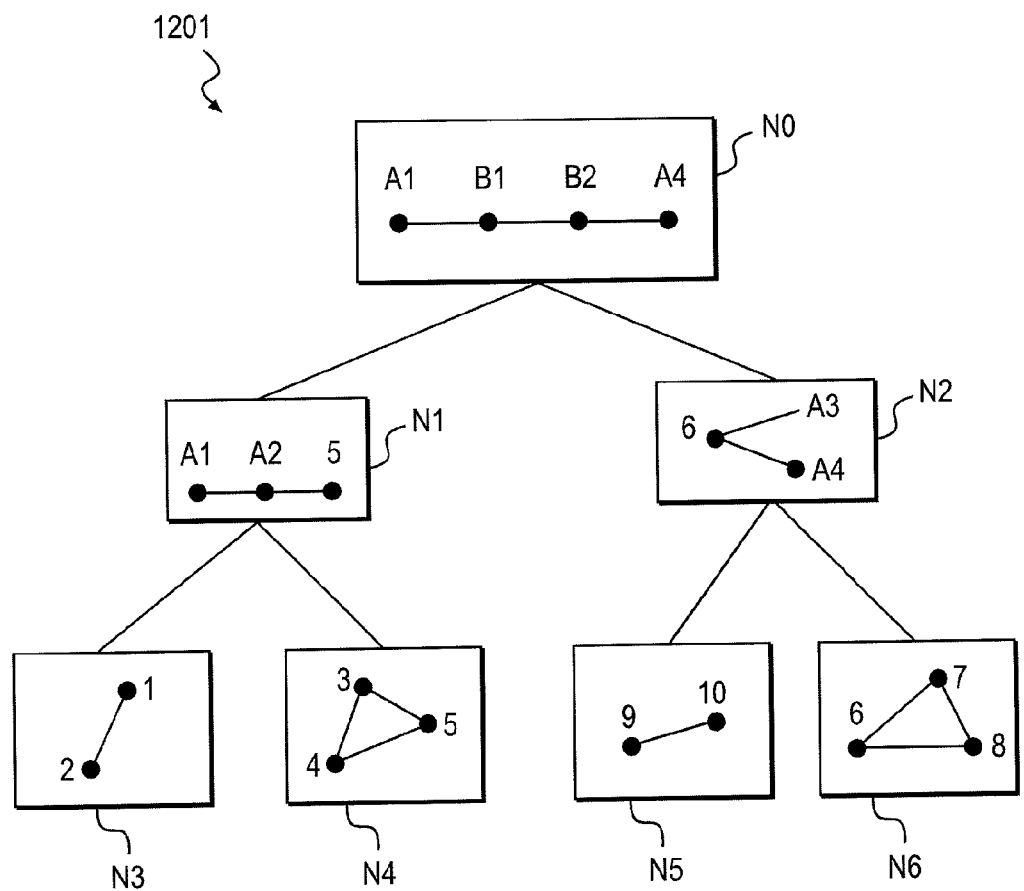
Figure 13:
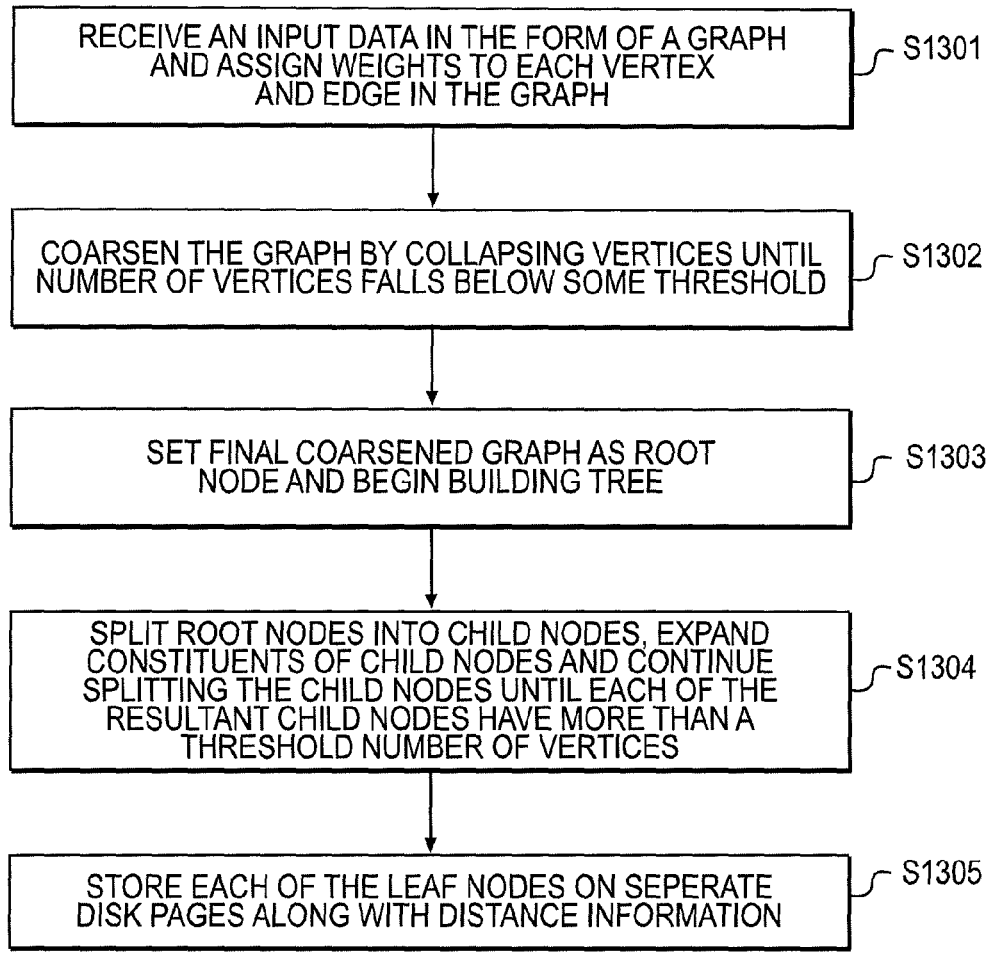
FIG. 13 illustrates a method for converting a dataset into a graph-based index.

As an example, consider graph G0 in FIG. 12A. Graph G0 is coarsened into graph G1 by collapsing vertices:

1, 2 into A1
3, 4 into A2
7,8 into A3
9, 10 in to A4

The graph G1 is further coarsened to a graph G2 by collapsing vertices:

A2 and 5 into B1
6 and A3 into B2

The coarsening described herein may be done by any conventional coarsening. For example, a well-known CoarsenGraph algorithm (Karypis, G., Kumar, V.: A fast and high quality multilevel scheme for partitioning irregular graphs. SIAM Journal on Scientific Computing 20 (1999) 359-392) may be used.

In the example of FIG. 12A, graph G2 is the root node, which we now use to construct a tree (we call it the DOGMA tree). We begin the tree building by partitioning the input graph (root node G2) into two roughly equal sized subgraphs while trying to minimize the edge-cut between the two. As can be seen from FIG. 12A, we can keep track of the number of vertices captured by each of the vertices in the root node. For example, vertex B1 corresponds to 3 vertices (3, 4, and 5) from the original graph G0. Therefore, we may select a partition which has equal number of vertices. This partitioning process is explained with reference to FIG. 12B.

We begin with the root node (call it N0). In S1304, split the root node N0 into 2 child nodes N1 and N2 and expand the constituents of each node. For example, N1 includes A1 and B1, which can be expanded into A2 and 5. We refine the two subgraphs N1 and N2 (if possible) by mapping them onto the finer graph from which the coarsened input graph was originally constructed. We add two child nodes to the DOGMA tree with the current node as parent and call the algorithm recursively on the newly created node, subgraph pairs.

If the input graph has no refinement, i.e., it corresponds to a subgraph of the original and is not the results of a coarsening step, and is smaller than some specified threshold, we have reached a leaf of the tree and do not grow the tree any further. In S1305, each of the leaf nodes is stored on an individual disk page. For example, once graph N1 is split into graphs N3 and N4, these 2 graphs do not include any elements which were the result of a coarsening step. That is none of the vertices represent another vertex. N3, N4, N5, and N6 are our leaf nodes and we stop the partitioning at this point. The resultant tree structure 1201 is referred to as the DOGMA tree. As an optional step in the algorithm, we color the nodes at some specified level of the DOGMA tree and compute the distances to these colors for all vertices in the original graph. These distances are used to evaluate distance constraints in the query answering algorithm. For example, assume that leaf node N3 was colored Red, N4 was colored Green, N5 was colored Blue, and N6 was colored Yellow. Then, for each vertex in the original graph (G0), the distance to the nearest vertex in a different colored partition is calculated. The distance is based on the number of edges required to connect two vertices. For example, the vertex closest to 1 in the green leaf node is 4. The distance between 1 and 4 is one. Similarly, the vertex closest to 1 in the blue leaf node is 9. The distance between 1 and the blue leaf node is 4. Similarly, the distance between 1 and the yellow leaf node is 3. Each of these distances is calculated and stored for each of the vertices at some level in the DOGMA tree. In our example, we chose the bottom most level for this distance computation. We call this distance computation "external partition distance" (epd).

An alternative way to compute these lower bound distances is to compute the shortest path distance for each vertex in the original graph subsumed by (i.e. coarsened into) the input graph to the closest vertex from the another subgraph. We call this distance the "internal partition distance" (ipd). In order to compute the ipd for a given vertex; find the partition (node) to which it belongs and find the distance to the closest vertex outside the partition. In the ipd computation, the distance at each partition level is calculated and stored. For example, at the bottom most level, the ipd for vertex 1 is one because vertex 4 is the closest vertex outside node N3. One level above the leaf node level, the ipd for vertex 1 is three because the closet vertex in node N2 is 6 and the distance from vertex 1 to vertex 6 is three.

Finally, the individual nodes together with the lower bound distances for their vertices are written to individual disk pages. Going back to the DOGMA index 1100 of FIG. 11, the leaf nodes 1101 (labeled as nodes N7-N14) are each stored on a single disk page.

Figure 14:
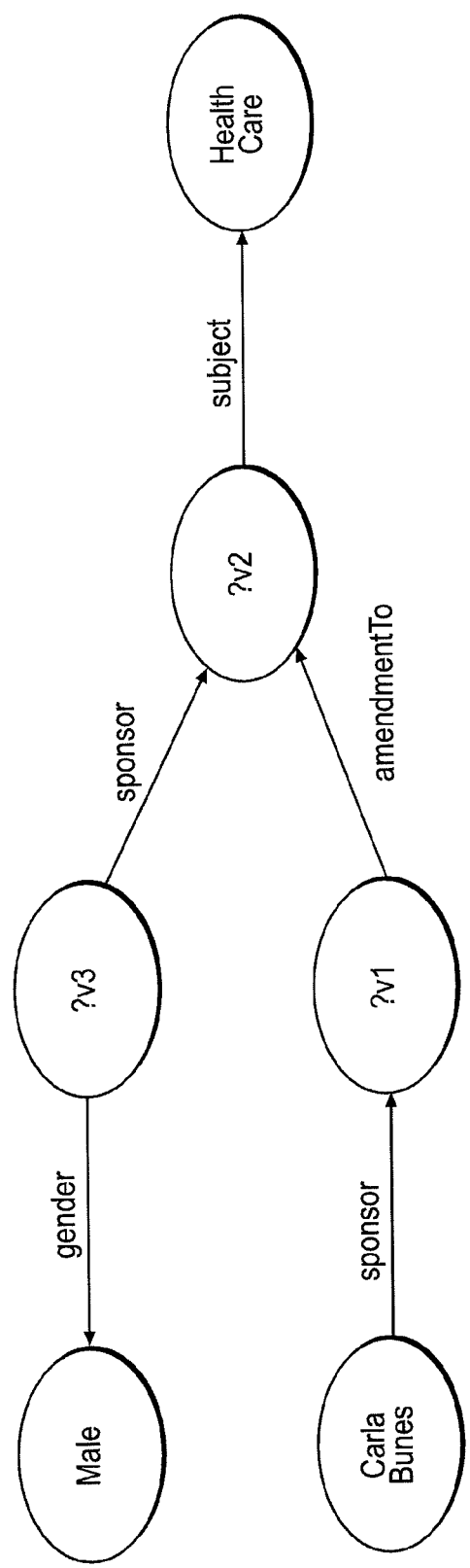
FIG. 14 illustrates an exemplary query to be answered by the graph-based index created by using the method of FIG. 13.

Next, an algorithm is presented for answering queries against a DOGMA index stored on external memory. To explain this algorithm, consider the dataset 1000 (FIG. 10), the resulting DOGMA index of FIG. 11, and a query (FIG. 14) to be answered. This query asks for all amendments (?v1) sponsored by Carla Bunes to a bill (?v2) on the subject of health care that were originally sponsored by a male person (?v3).

Figure 15:
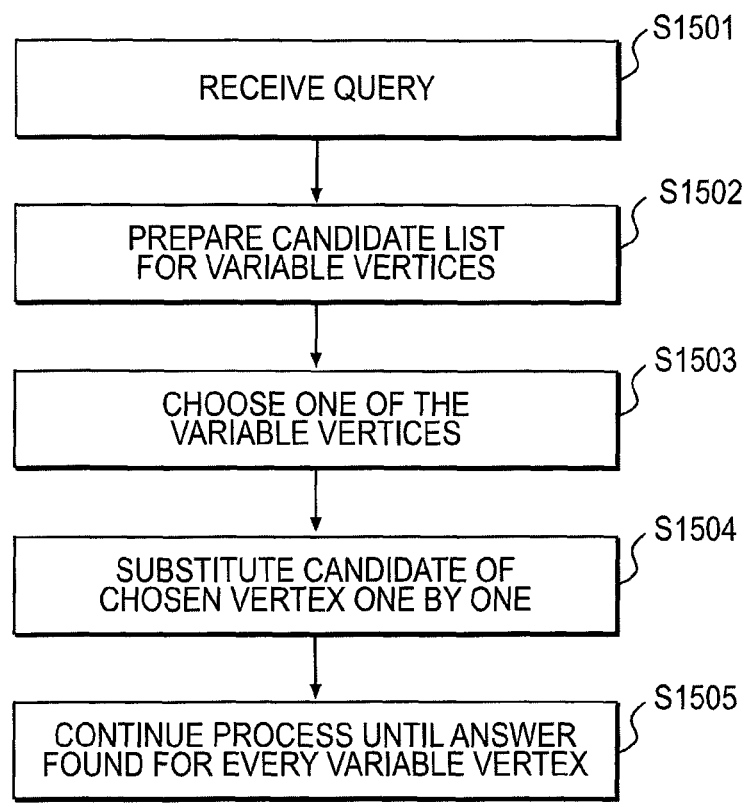
FIG. 15 illustrates an exemplary process of answering a query.
Figure 16A:
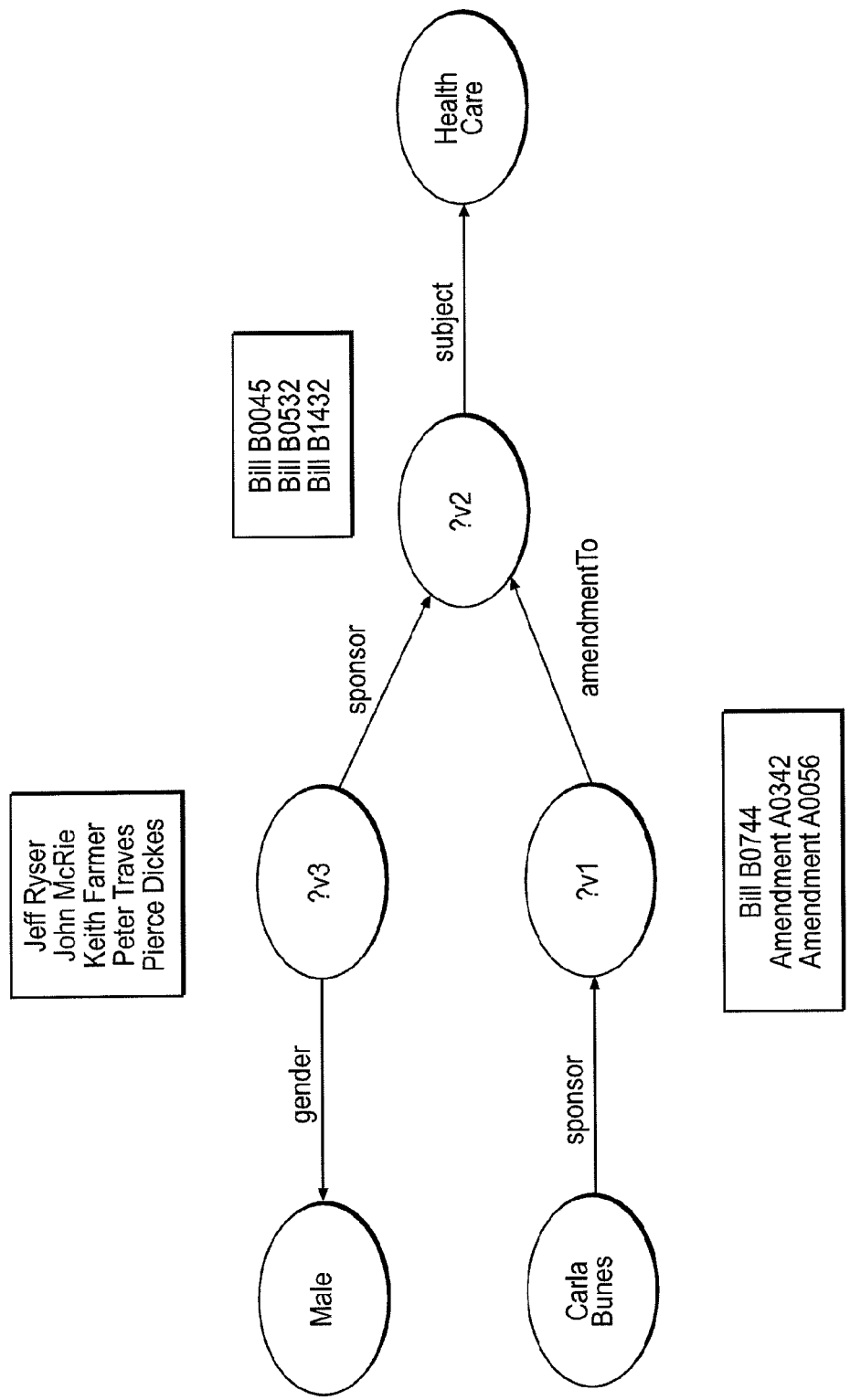
FIGS. 16A and 16B illustrate intermediate results in the process of FIG. 15.

FIG. 15 describes the algorithm. In S1501, a query is received by a processor that is operatively coupled to a disk that stores the DOGMA Index 1100. In particular, the leaf nodes (N7-N14) are stored on disk. In S1502, the processor prepares an initial result candidate list for each of the variables by looking at the neighborhood of each constant vertex and the edge label to the constant vertex. For example, in the query shown in FIG. 14, Carla Bunes is a constant vertex. From the DOGMA index 1100, it is determined that she has sponsored three bills Bill B0744, Amendment A0342, and Amendment A0056. These 3 bills are the initial candidate list for variable vertex ?v1. Similarly, initial candidate lists for each variable vertex is determined, wherever such determination is feasible. The result of S1502 is shown in FIG. 16A.

Figure 16B:
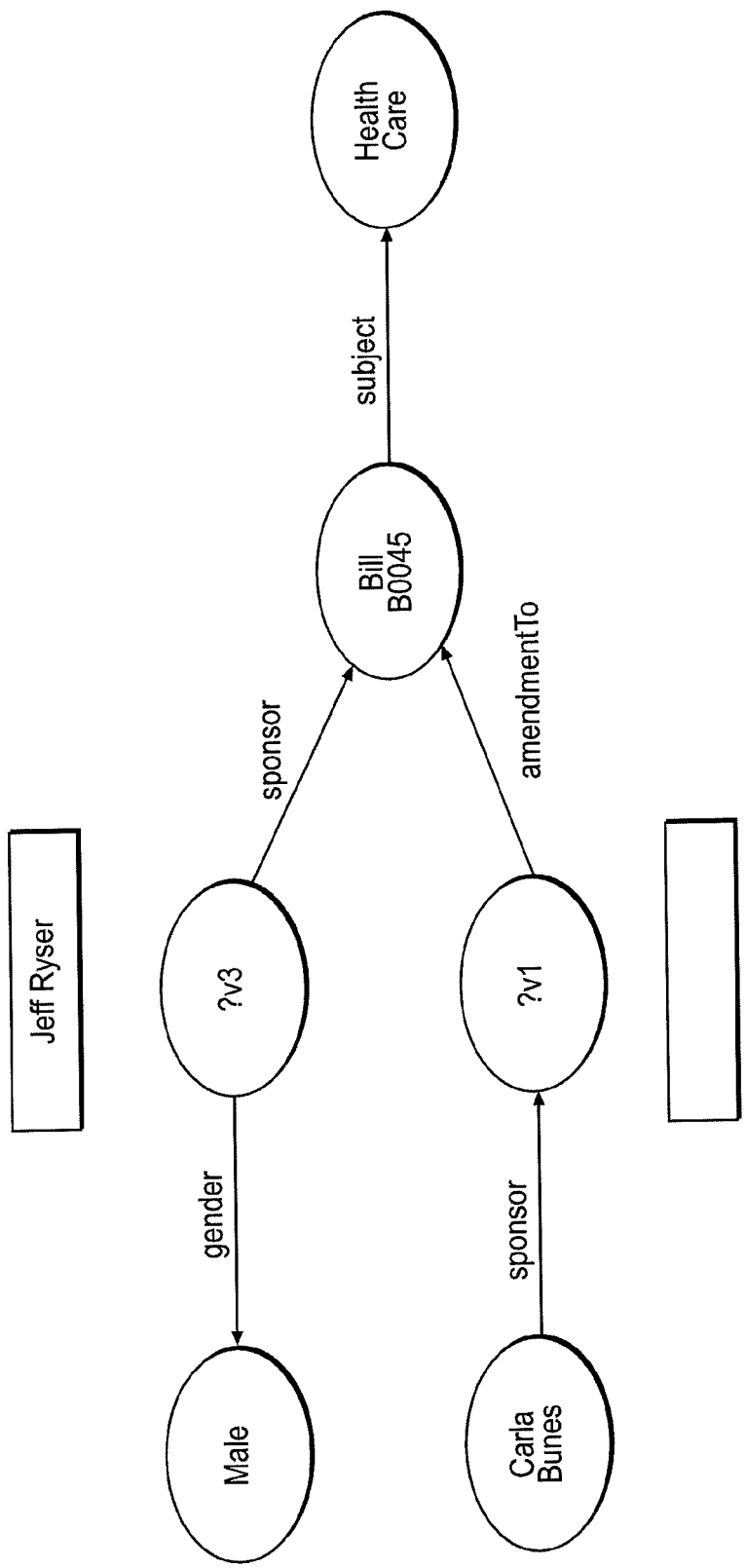

In S1503, choose the variable vertex with the smallest initial candidate list. In FIG. 16A, vertex ?v2 and ?v1 each have 3 candidates. Suppose, ?v2 is chosen. Now, in S1504 chose any one of the candidates for ?v2 and find possible substitutions for the remaining variable vertices. If any of the candidate result lists associated with the variable vertices is empty, this substitution should not be pursued any further and the algorithm chooses the next candidate for the chosen vertex ?v2. For example, if Bill B0045 is chosen for ?v2, the candidate list for ?v1 is empty. FIG. 16B shows this scenario. Therefore, Bill B0045 cannot be the right answer. As Bill B0045 is discarded, the remaining candidates are tried until we find the correct answer, which is Bill B1432 in this case. In S1505, we move onto the next variable vertex (if any remaining) and repeat S1504.

Figure 17A:
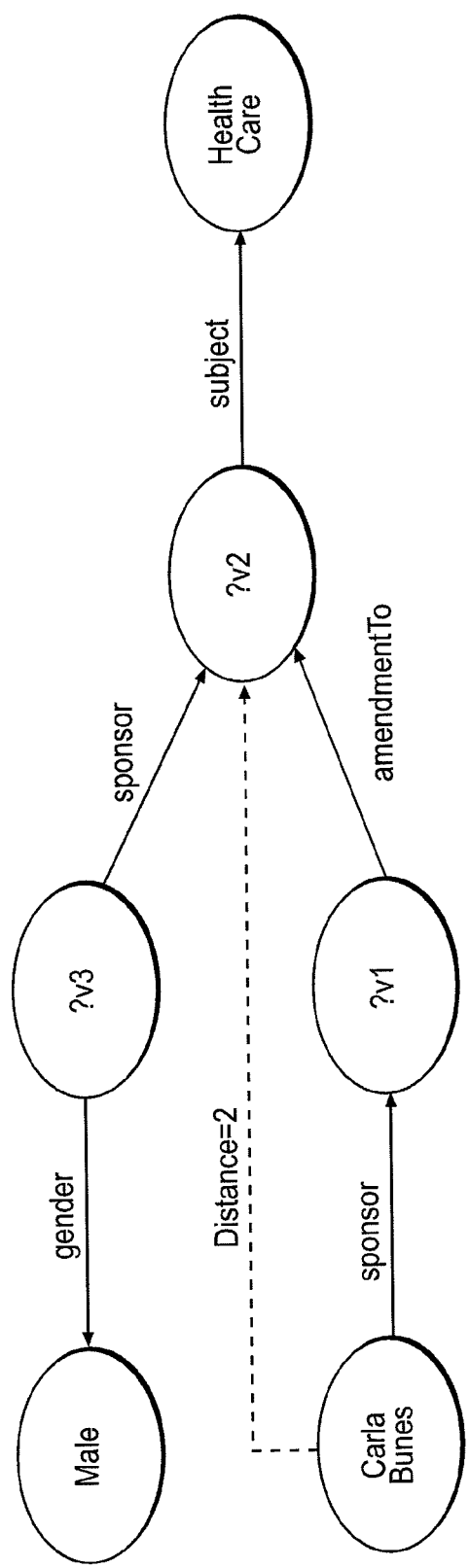
FIG. 17A graphically illustrates a distance constraint between vertices in a query.

The algorithm described in FIG. 15 can be improved by considering the distances (ipd and epd) that we computed and stored while building the DOGMA index. The basic query answering algorithm presented in FIG. 15 only uses "short range" dependencies, i.e., the immediate vertex neighborhood of variable vertices, to constrain their result candidates. While this suffices for most simple queries, considering "long range" dependencies can yield additional constraints on the result candidates and thus improve query performance. For instance, the result candidates for ?v1 in our example query not only must be immediate neighbors of "Carla Bunes": in addition, they must be at most at a distance of 2 from "Health Care". Such constraints exist on all variable vertices. For example, FIG. 17A shows that the variable vertex ?v2 is at a distance 2 from Carla Bunes. Hence, any vertex that is more than a distance of 2 from Carla Bunes cannot be an answer for ?v2. We use this insight in pruning our search results and making the search faster.

Assume that the candidate lists have been determined for each of the variable vertices in S1502. In this disclosure, two distance measurements were discussed: ipd and epd.

Consider the first case where we prune the search results using ipd. Carla Bunes is stored in node N10, which is under node N4, which is under node N1. Therefore, at the bottom most level the ipd for Carla Bunes is 1 as it is connected to Bills B0744 (node N8) and Amendment A0342 (node N8). One level higher, the ipd for Carla Bunes is again 1 because Carla Bunes is in node N4, and Bill B0744 and Amendment A0342 are in node N3. One level again higher, Carla Bunes is in node N1 and the closest vertex in node N2 to Carla Bunes is US Senate, which is at a distance 3 from Carla Bunes. Therefore, the ipd at this level is 3.

Figure 17B:
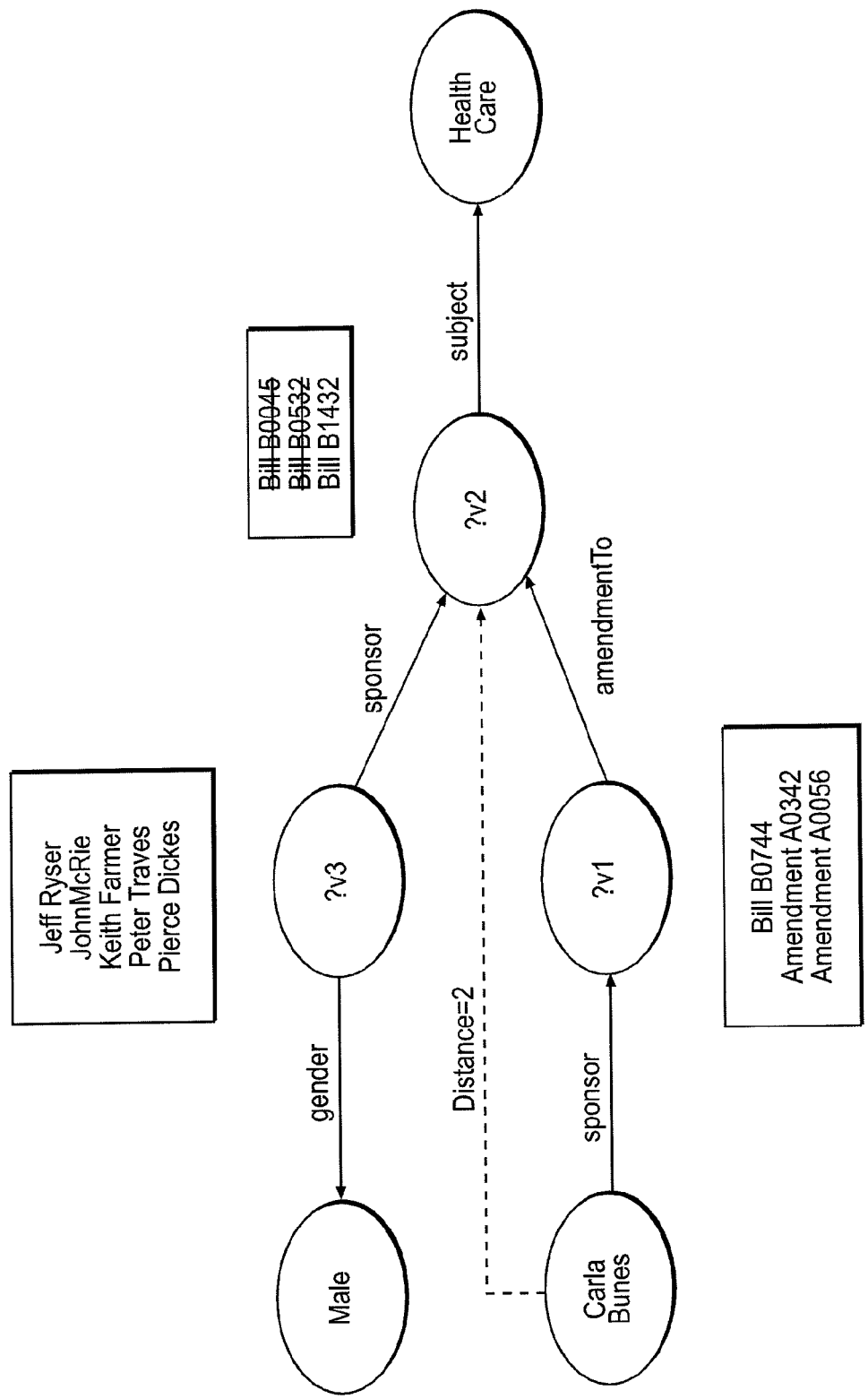
FIGS. 17B and 17C illustrate intermediate results in query processing when using distance constraints.

As ?v2 can only be at a distance 2, any candidates in the list for ?v2 that fall under node N2 can be discarded. From FIG. 11, it can be seen that Bill B0045 (node N11) and Bill B0532 (node N13) fall under node N2 and hence are at least a distance 3 away from Carla Bunes and cannot be our answer for ?v2. Accordingly, Bill B1432 has to be the only possible answer for ?v2. The result is shown in FIG. 17B.

It is possible that a variable vertex may have more than one distance constraint. For example, ?v2 has a distance constraint of 2 from the vertex Male.

Figure 17C:
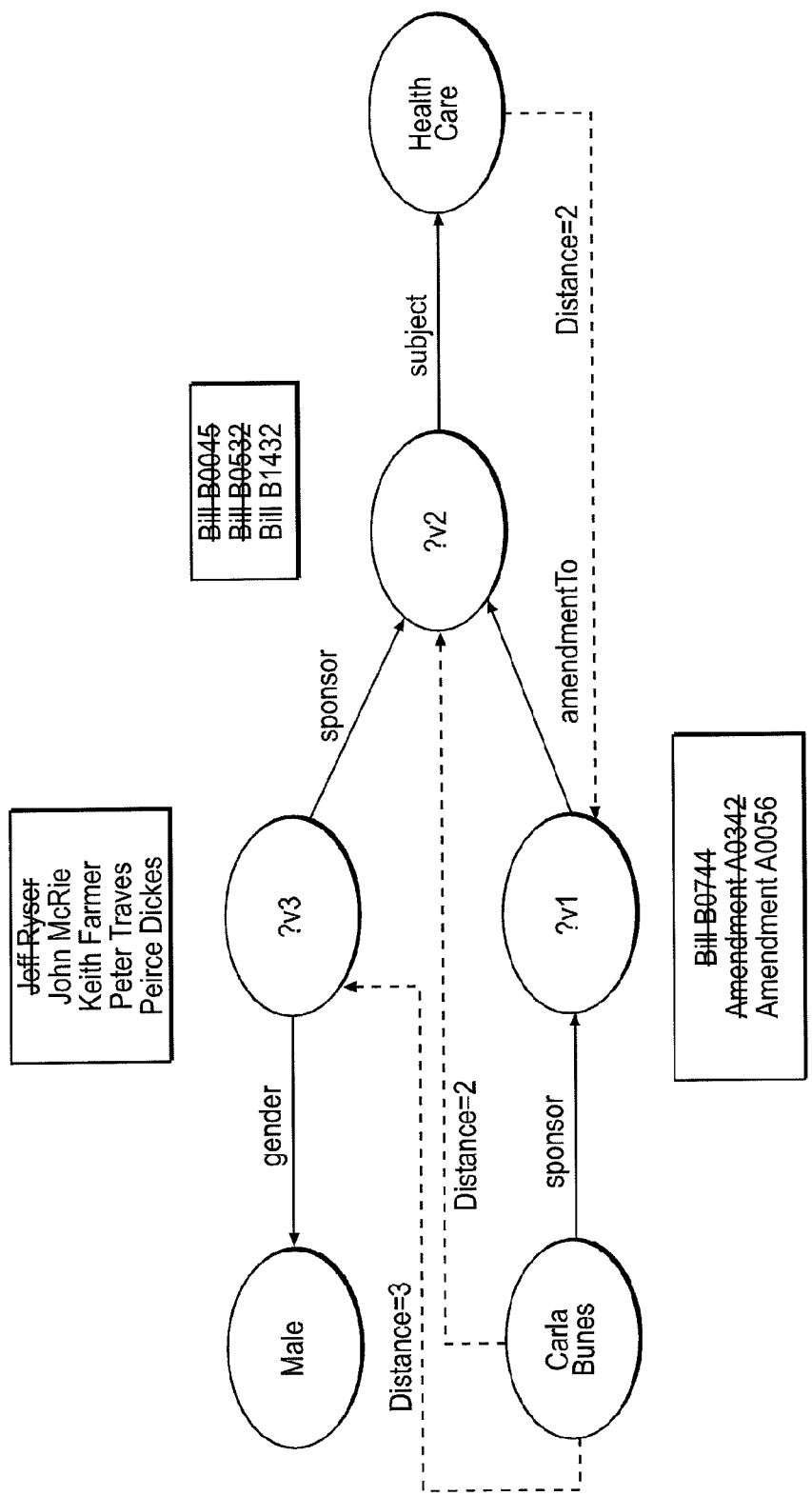

Now, consider epd for the pruning of the search results. Epd considers the distance to other subgraphs (nodes) at a given level (distance from the root node) of the DOGMA tree. Considering, epd at the bottom level (at the level of nodes N7-N15), the distance from Carla Bunes to each of nodes N7-N9 and N11-N14 is stored for Carla Bunes at the time of storing the vertices on the disk pages. The epd from Carla Bunes to node N11 is 4, node N13 is 3. As Bill B0045 and B0532 are in these two nodes, respectively, they are outside our distance constraint for ?v2. Accordingly, the answer for ?v2 is Bill B1432. FIG. 17C shows the result of using Epd to prune the search results.

The candidate result lists contain possible substitutions for that variable vertex whereas the constraint sets contain a number of distance constraints on that vertex with respect to other vertices in the query that any feasible substitution must satisfy.

In summary, the following additional steps are followed when pruning the search results with distance constraints. We choose the variable vertex with the smallest, non-null candidate result set and iterate over all candidates substituting them one at a time for the respective variable vertex. Now, we check that the substituted candidate satisfies all distance constraints associated with the variable vertex it was substituted for. If one of them is violated the candidate is discarded. Else we proceed by updating the candidate result lists of all adjacent vertices in the query as before using the DOGMA index with respect to the new substitute.

It should be noted that we took the example of a social network for describing the various exemplary implementations. However, social networks were chosen as an example because it would be more easily appreciated and understood by the audience of this disclosure. This disclosure and its exemplary implementations are applicable to any data network, which can be expressed in the form of a graph. An example of this kind of data network may be found in the telecommunications industry in which phone numbers and users, user locations, areas, etc. can be expressed as a graph.

Furthermore, each of the processes described above may be implemented by a special purpose computer operating in accordance with instructions stored on a tangible computer-readable storage medium. A non-exhaustive list of the storage medium would include the following: a portable computer diskette such as a floppy disk or a flexible disk, magnetic tape or any other magnetic medium, a hard disk, a random access memory (RAM), a read-only memory (ROM), an erasable programmable read-only memory (EPROM or Flash memory), a memory card, any other memory chip or cartridge, an optical fiber, a portable compact disc read-only memory (CD-ROM), any other optical medium, punch cards, paper tape, any other physical medium with patterns of holes, or any other medium from which a computer/controller can read or suitable combination of the foregoing. The algorithms described throughout this disclosure can be stored as program code on a plurality of computer-readable storage media that can enable a normal computer or processor to become a special machine capable of carrying out the intended algorithms.

The foregoing exemplary embodiments are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. A method of answering a query expressed as a graph, for a data network stored across a plurality of compute nodes as a graph-based index including a plurality of vertices connected by edges, the method comprising:

marking a constant vertex in the query expressed as the graph and transmitting the query to one of the plurality of compute nodes storing a first vertex, from among the plurality of vertices of the graph-based index, that corresponds to the constant vertex, the query including the constant vertex and a plurality of variable vertices connected by an edge label;

determining vertices connected to the first vertex and preparing a candidate substitution list for each of the plurality of variable vertices by looking at the neighborhood of the constant vertex and the edge label to the constant vertex;

choosing a first candidate from the candidate substitution list corresponding to a first variable vertex, among the plurality of variable vertex, and substituting candidates for the other variable vertices in among the plurality of variable vertex from the respective candidate substitution list;

when it is determined that any of the candidate substitution list associated with other variable vertices corresponding to the chosen first candidate is empty, choosing a second candidate from the candidate list corresponding to the first variable vertex, and repeating substituting candidates for the other variable vertices in among the plurality of variable vertex; and preparing an answer to the query based on a result of the substitution of candidates from the candidate substitution list of each of the plurality of variable vertices.

2. The method of claim 1, wherein the plurality of compute nodes are split across a compute cloud.

3. The method of claim 1, wherein when the result with distance constraints are pruned, a variable vertex with the smallest, non-null candidate result is set and iterated over all candidates substituting the other variable vertices among the plurality of variable vertex one at a time for the respective variable vertex.

4. The method of claim 3, further comprising:
determining whether the substituted candidate satisfies all distance constraints associated with the respective variable vertex;
discarding the substituted candidate if one of the distance constraints is violated; and
updating the candidate substitution list if the distance constraints are met.

* * * * *